(12) United States Patent
Nakamura et al.

(10) Patent No.: US 11,742,483 B2
(45) Date of Patent: Aug. 29, 2023

(54) NICKEL MANGANESE COMPOSITE HYDROXIDE AND METHOD FOR PRODUCING SAME, POSITIVE ELECTRODE ACTIVE MATERIAL FOR NONAQUEOUS ELECTROLYTE SECONDARY BATTERY AND METHOD FOR PRODUCING SAME, AND NONAQUEOUS ELECTROLYTE SECONDARY BATTERY

(71) Applicant: SUMITOMO METAL MINING CO., LTD., Tokyo (JP)

(72) Inventors: Takuma Nakamura, Niihama (JP); Haruki Kaneda, Niihama (JP); Takehide Honma, Niihama (JP); Takaaki Ando, Niihama (JP); Koji Yamaji, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 17/865,714

(22) Filed: Jul. 15, 2022

(65) Prior Publication Data

US 2022/0399544 A1  Dec. 15, 2022

Related U.S. Application Data

(62) Division of application No. 16/320,748, filed as application No. PCT/JP2017/021009 on Jun. 6, 2017, now Pat. No. 11,476,460.

(30) Foreign Application Priority Data

Jul. 29, 2016 (JP) .................................. 2016-150620

(51) Int. Cl.
*H01M 4/525* (2010.01)
*C01G 53/00* (2006.01)
(Continued)

(52) U.S. Cl.
CPC ............ *H01M 4/525* (2013.01); *C01G 53/00* (2013.01); *C01G 53/006* (2013.01); *C01G 53/04* (2013.01);
(Continued)

(58) Field of Classification Search
CPC .... H01M 4/505; H01M 4/525; C01G 53/006; C01G 53/04; C01G 53/50; C01P 2004/54
See application file for complete search history.

(56) References Cited

U.S. PATENT DOCUMENTS 6,153,334 A    11/2000  Sakamoto et al.
10,236,507 B2  3/2019   Yamaji et al.
(Continued)

FOREIGN PATENT DOCUMENTS

CN    1228621 A     9/1999
CN    105377765 A   3/2016
(Continued)

OTHER PUBLICATIONS

JPH1160243 English translation. Ishida et al. Japan. Mar. 2, 1999. (Year: 1999).*
(Continued)

*Primary Examiner* — Christopher P Domone
(74) *Attorney, Agent, or Firm* — WHDA, LLP

(57) ABSTRACT

Provided are a nickel-manganese composite hydroxide capable of producing a secondary battery having a high particle fillability and excellent battery characteristics when used as a precursor of a positive electrode active material and a method for producing the same. A nickel-manganese composite hydroxide is represented by General Formula: $Ni_xMn_yM_z(OH)_{2+\alpha}$ and contains a secondary particle formed of a plurality of flocculated primary particles. The primary particles have an aspect ratio of at least 3, and at least some of the primary particles are disposed radially
(Continued)

from a central part of the secondary particle toward an outer circumference thereof. The secondary particle has a ratio I(101)/I(001) of a diffraction peak intensity I(101) of a 101 plane to a peak intensity I(001) of a 001 plane, measured by an X-ray diffraction measurement, of up to 0.15.

9 Claims, 10 Drawing Sheets

(51) Int. Cl.
  *C01G 53/04* (2006.01)
  *H01M 4/505* (2010.01)
  *H01M 10/0525* (2010.01)
  *H01M 4/02* (2006.01)
(52) U.S. Cl.
  CPC ............ *C01G 53/50* (2013.01); *H01M 4/505* (2013.01); *H01M 10/0525* (2013.01); *C01P 2002/74* (2013.01); *C01P 2004/03* (2013.01); *C01P 2004/50* (2013.01); *C01P 2004/51* (2013.01); *C01P 2004/54* (2013.01); *C01P 2004/61* (2013.01); *C01P 2004/64* (2013.01); *C01P 2006/11* (2013.01); *C01P 2006/14* (2013.01); *C01P 2006/16* (2013.01); *C01P 2006/40* (2013.01); *H01M 2004/028* (2013.01)

(56) References Cited

U.S. PATENT DOCUMENTS

| | | |
|---|---|---|
| 2009/0029253 A1 | 1/2009 | Itou et al. |
| 2012/0270107 A1 | 10/2012 | Toya et al. |
| 2014/0106228 A1 | 4/2014 | Toya et al. |
| 2014/0158932 A1 | 6/2014 | Sun et al. |
| 2015/0093580 A1* | 4/2015 | Kobayashi ............ H01M 4/525 428/403 |
| 2015/0221989 A1* | 8/2015 | Hayashi ................. H01M 4/52 429/218.2 |
| 2015/0364761 A1* | 12/2015 | Fukui ..................... C01G 53/50 429/223 |
| 2016/0028073 A1 | 1/2016 | Ohara et al. |
| 2016/0036041 A1 | 2/2016 | Uwai et al. |
| 2016/0036044 A1 | 2/2016 | Ohara et al. |
| 2016/0118662 A1 | 4/2016 | Schroedle et al. |
| 2016/0133927 A1 | 5/2016 | Kamata et al. |
| 2016/0172674 A1 | 6/2016 | Oda et al. |
| 2016/0218362 A1 | 7/2016 | Kagei et al. |
| 2016/0244336 A1 | 8/2016 | Toya et al. |
| 2016/0248091 A1 | 8/2016 | Toya et al. |
| 2017/0012288 A1 | 1/2017 | Yamaji et al. |
| 2017/0288215 A1 | 10/2017 | Mitsumoto et al. |
| 2017/0338485 A1 | 11/2017 | Toya et al. |
| 2018/0175387 A1 | 6/2018 | Kim et al. |
| 2018/0190983 A1 | 7/2018 | Fukui et al. |
| 2018/0205080 A1 | 7/2018 | Toya et al. |
| 2018/0254481 A2 | 9/2018 | Kamata et al. |
| 2019/0248673 A1 | 8/2019 | Kaneda et al. |
| 2019/0252681 A1 | 8/2019 | Kaneda et al. |
| 2019/0260024 A1 | 8/2019 | Nakamura et al. |
| 2019/0296348 A1 | 9/2019 | Kaneda et al. |
| 2020/0335781 A1 | 10/2020 | Oshita et al. |
| 2020/0358093 A1 | 11/2020 | Oshita et al. |

FOREIGN PATENT DOCUMENTS

| | | | |
|---|---|---|---|
| JP | H1160243 | * | 3/1999 |
| JP | H11-317224 A | | 11/1999 |
| JP | H11317224 | * | 11/1999 |
| JP | 2002-304992 A | | 10/2002 |
| JP | 2003-051311 A | | 2/2003 |
| JP | 2011-116580 A | | 6/2011 |
| JP | 2011-187419 A | | 9/2011 |
| JP | 2012-252844 A | | 12/2012 |
| JP | 2013-144625 A | | 7/2013 |
| JP | 2015-002120 A | | 1/2015 |
| JP | 2015-076397 A | | 4/2015 |
| JP | 2016-004703 A | | 1/2016 |
| JP | 2016-522147 A | | 7/2016 |
| WO | 2006/118279 A1 | | 11/2006 |
| WO | 2012/169274 A1 | | 12/2012 |
| WO | 2015/115547 A1 | | 8/2015 |

OTHER PUBLICATIONS

JPH11317224 English translation. Sakamoto et al. Japan. Nov. 16, 1999. (Year: 1999).*
International Search Report dated Sep. 5, 2017, issued in counterpart application No. PCT/JP2017/021009, with English translation. (4 pages).
International Preliminary Report on Patentability (Form PCT/IB/373) issued in counterpart International Application No. PCT/JP2017/021009 dated Jan. 29, 2019 with Form PCT/ISA/237, with English translation. (9 pages).
Noh, Hyung-Joo et al., "Cathode Material with Nanorod Structure—An Application for Advanced High-Energy and Safe Lithium Batteries", Chemistry of Materials, US, May 2, 2013, vol. 25, pp. 2109-2115, DOI: 10.1021/cm4006772; Cited in JP Office Action dated Apr. 27, 2021 (15 pages).
Office Action dated Mar. 19, 2021, issued in counterpart CN Application No. 201780047291.1, with English translation. (29 pages).
Office Action dated Apr. 27, 2021, issued in counterpart JP Application No. 2018-529407, with English translation. (14 pages).
International Search Report dated Sep. 5, 2017, issued in application No. PCT/JP2017/027538 (counterpart to U.S. Appl. No. 16/320,601), with English translation. (4 pages).
International Preliminary Report on Patentability (Form PCT/IB/373) issued in International Application No. PCT/JP2017/027538 dated Jan. 29, 2019 with Form PCT/ISA/237 (counterpart to U.S. Appl. No. 16/320,601), with English translation. (18 pages).
Written Opinion dated Sep. 5, 2017, issued in International application No. PCT/JP2017/02/538 (counterpart to U.S. Appl. No. 16/320,601), with English translation. (16 pages).
Office Action dated Jan. 25, 2022, issued in JP application No. 2018-530436 (counterpart to U.S. Appl. No. 16/320,601), with English translation. (10 pages).
Non-Final Office Action dated Jun. 16, 2021, issued in U.S. Appl. No. 16/320,601. (18 pages).

* cited by examiner

NICKEL MANGANESE COMPOSITE HYDROXIDE AND METHOD FOR PRODUCING SAME, POSITIVE ELECTRODE ACTIVE MATERIAL FOR NONAQUEOUS ELECTROLYTE SECONDARY BATTERY AND METHOD FOR PRODUCING SAME, AND NONAQUEOUS ELECTROLYTE SECONDARY BATTERY

CROSS-REFERENCE TO RELATED APPLICATIONS

The present application is a Divisional application of Ser. No. 16/320,748 filed on Apr. 17, 2019, which is a national stage application filed under 35 USC 371 of International Application No. PCT/JP2017/021009, filed Jun. 6, 2017, and which is based upon and claims the benefit of priority from the prior Japanese Patent Application No. 2016-150620, filed on Jul. 29, 2016, the entire contents of which are incorporated herein by reference.

TECHNICAL FIELD

The present invention relates to a nickel-manganese composite hydroxide and a method for producing the same, a positive electrode active material for a nonaqueous electrolyte secondary battery and a method for producing the same, and a nonaqueous electrolyte secondary battery.

BACKGROUND ART

With the recent wide spreading use of portable electronic devices such as a mobile phone and a notebook personal computer, there has been a strong demand to develop a small and light nonaqueous electrolyte secondary battery having a high energy density. As the nonaqueous electrolyte secondary battery like this, a lithium ion secondary battery may be cited. In the negative electrode material of the lithium ion secondary battery, a lithium metal, a lithium alloy, a metal oxide, a carbon, or the like is used. These materials can de-insert and insert lithium.

The lithium ion secondary battery like this is now under active research and development. Among them, the lithium ion secondary battery using, in the positive electrode thereof, a lithium-transition metal composite oxide, especially a lithium-cobalt composite oxide ($LiCoO_2$) that is comparatively easily synthesized, can generate a high voltage of a 4-V class; and thus, this is hoped as the battery having a high energy density; and it is being put in actual use. Also, a lithium-nickel composite oxide ($LiNiO_2$), a lithium-nickel-cobalt-manganese composite oxide ($LiNi_{0.33}Co_{0.33}Mn_{0.33}O_2$), and the like using nickel, which is cheaper than cobalt, have been developed. Among them, the lithium-nickel-cobalt-manganese composite oxide is drawing attention because this is comparatively cheap and has an excellent balance among heat stability, durability, and so forth. However, because the capacity thereof is inferior to that of a nickel type, enhancement of the capacity (energy density) is demanded. In addition, for the lithium ion secondary battery, not only the battery capacity but also excellent output characteristic and cycle characteristic are demanded.

In order to enhance the capacity, it is important to enhance not only the capacity per a unit weight of the active material but also the energy density per a unit volume thereof. In order to enhance the capacity per a unit weight of the active material, for example, in Patent Literature 1, the active material having a narrow particle size distribution with a uniform particle diameter is proposed. Because the active material like this can undergo a uniform electrochemical reaction, it has characteristics of a high capacity and a long life; on the other hand, because there is a tendency of a poor particle fillability, it cannot say that the volume energy density thereof is high.

As the study about the method to enhance the capacity per a unit weight in an alternative way, control of a particle structure may be cited. For example, Patent Literature 2 indicates that when a precursor hydroxide is lightly crushed followed by granulation and spheroidization so as to include voids therein, a positive electrode active material having a high ratio of an open pore can be obtained. However, because this method includes a crushing process of the precursor and the subsequent process to make the slurry thereof, this is not industrial, and thus, not suitable for mass production.

In order to enhance the energy density per a unit volume, a method is studied how to enhance a particle fillability. For example, in Patent Literature 3, a method in which particles having different particle diameters are mixed is proposed. Particles having larger particle diameters are separated from particles having smaller particle diameters; and by changing the weight ratio in mixing them, a positive electrode active material having a good fillability and competitively satisfying excellent rate characteristic and capacity can be obtained. However, in this method, additional processes such as the process to prepare two kinds of particles having different particle diameters are necessary; and thus, the production cost thereof is high.

As described above, at the present time neither a lithium-metal composite oxide capable of satisfactorily raising the performance of the lithium ion battery nor a composite hydroxide that can be a raw material of the composite oxide like this is developed. Furthermore, although many methods for producing the composite hydroxide have been also studied, at the present time a method capable of producing, in an industrial scale, the composite hydroxide that can be a raw material of the lithium-metal composite oxide capable of satisfactorily raising the performance of the lithium ion secondary battery has not been developed yet. With the background like this, development of a positive electrode active material having a high capacity and a good particle fillability is wanted; and also, development of an industrially advantageous production method capable of realizing mass production with a reduced production cost is wanted.

CITATION LIST

Patent Literatures

[Patent Literature 1] Japanese Patent Laid-Open Publication No. 2011-187419
[Patent Literature 2] Japanese Patent Laid-Open Publication No. 2003-051311
[Patent Literature 3] Japanese Patent Laid-Open Publication No. 2015-76397

SUMMARY OF INVENTION

Technical Problems

In view of the problems described above, the present invention intends to provide: a positive electrode active material for a nonaqueous electrolyte secondary battery having a high battery capacity, a high output characteristic, and an excellent cycle characteristic with suppressed deterioration of the battery capacity even upon repeating the charging and discharging operations; and a nickel-manganese composite hydroxide usable as a precursor of the active material. In addition, the present invention provides a nonaqueous electrolyte secondary battery having a high battery capacity, a high output characteristic, and a long life because of the excellent cycle characteristic. Furthermore, the present invention intends to provide: a method for readily producing a nickel-manganese composite hydroxide in an industrial scale; and a method for producing a positive electrode active material for a nonaqueous electrolyte secondary battery by using the nickel-manganese composite hydroxide.

Solution to Problems

The inventors of the present invention carried out an extensive investigation about effects of the particle structure on the output characteristic and the cycle characteristic of the nonaqueous electrolyte secondary battery; and as a result, it was found that the output characteristic and the cycle characteristic are able to be improved when the positive electrode active material for a nonaqueous electrolyte secondary battery has a certain particle structure or a crystal orientation. It was also found that the particle structure of the positive electrode active material is significantly influenced by the particle structure and crystallinity of a composite hydroxide that is a precursor thereof; and thus, characteristics of the positive electrode active material are able to be improved by controlling the particle structure and crystallinity of the composite hydroxide, and that the particle structure and crystallinity of the composite hydroxide are able to be controlled by using a certain crystallization condition. The present invention has been completed based on these findings.

A first aspect of the present invention provides a nickel-manganese composite hydroxide, in which the nickel-manganese composite hydroxide is represented by General Formula (1): $Ni_xMn_yM_z(OH)_{2+\alpha}$ (in Formula (1), M is at least one additional element selected from Co, Ti, V, Cr, Zr, Nb, Mo, Hf, Ta, Fe, and W; and x, y, z, and $\alpha$ satisfy $0.1 \leq x \leq 0.8$, $0.1 \leq y \leq 0.6$, $0 \leq z \leq 0.8$, $x+y+z=1.0$, and $0 \leq \alpha \leq 0.4$) and contains a secondary particle formed of a plurality of flocculated primary particles. The primary particles have an average aspect ratio of at least 3, and at least some of the primary particles are disposed radially in a direction from a central part of the secondary particle to an outer circumference thereof. The secondary particle has a ratio (I(101)/I(001)) of a diffraction peak intensity I(101) of a 101 plane to a peak intensity I(001) of a 001 plane, measured by an X-ray diffraction measurement, of up to 0.15.

Here, it is preferable that in an area within 50% of a radius of the secondary particle from the outer circumference of the secondary particle toward the central part thereof, at least 50% of the primary particles in number relative to a total number of the primary particles present within this area be disposed radially. In addition, it is preferable that a total pore volume in a pore volume distribution be at least 0.015 cm³/g and up to 0.03 cm³/g. In addition, it is preferable that a volume-average particle diameter MV be at least 5 μm and up to 20 μm, and [(D90−D10)/average particle diameter] that is an indicator to represent a spread of particle size distribution be at least 0.7.

A second aspect of the present invention provides a method for producing a nickel-manganese composite hydroxide, in which the nickel-manganese composite hydroxide is represented by General Formula (1): $Ni_xMn_yM_z(OH)_{2+\alpha}$ (in Formula (1), M is at least one additional element selected from Co, Ti, V, Cr, Zr, Nb, Mo, Hf, Ta, Fe, and W; and x, y, z, and $\alpha$ satisfy $0.1 \leq x \leq 0.8$, $0.1 \leq y \leq 0.6$, $0 \leq z \leq 0.8$, $x+y+z=1.0$, and $0 \leq \alpha \leq 0.4$) and contains a secondary particle formed of a plurality of flocculated primary particles. The method includes a crystallization process of forming a nickel-manganese composite hydroxide by neutralizing a salt containing at least nickel and a salt containing at least manganese in an aqueous reaction solution. In the crystallization process, a dissolved nickel concentration in the aqueous reaction solution is controlled in a range of at least 300 mg/L and up to 1,500 mg/L, a dissolved oxygen concentration is controlled in a range of at least 0.5 mg/L and up to 3.5 mg/L, and a stirring power applied to the aqueous reaction solution is controlled in a range of at least 4 kW/m³ and up to 8 kW/m³.

The crystallization process preferable includes continuously adding a mixed aqueous solution including nickel and manganese into a reaction vessel and overflowing slurry including nickel-manganese composite hydroxide particles formed by neutralization to recover the particles. In addition, in the crystallization process, it is preferable that a residence time of the mixed aqueous solution in the reaction vessel be at least 3 hours and up to 15 hours.

A third aspect of the present invention provides a method for producing a positive electrode active material for a nonaqueous electrolyte secondary battery. The method includes a process of mixing the nickel-manganese composite hydroxide and a lithium compound to obtain a mixture and a process of firing in which the mixture to obtain a lithium-nickel-manganese composite oxide.

It is preferable that the nickel-manganese composite hydroxide be obtained by the production method described above.

A fourth aspect of the present invention provides a positive electrode active material for a nonaqueous electrolyte secondary battery, in which the active material includes a lithium-nickel-manganese composite oxide containing a secondary particle formed of a plurality of flocculated primary particles and represented by General Formula (2): $Li_{1+u}Ni_xMn_yM_zO_{2+\beta}$ (in Formula (2), M is at least one additional element selected from Co, Ti, V, Cr, Zr, Nb, Mo, Hf, Ta, Fe, and W; and u, x, y, z, and $\beta$ satisfy $-0.05 \leq u \leq 0.5$, $0.1 \leq x \leq 0.8$, $0.1 \leq y \leq 0.6$, $0 \leq z \leq 0.8$, $x+y+z=1.0$, and $0 \leq \beta \leq 0.5$). When an arbitrary radial direction from a center of a cross section of the secondary particle toward an outside thereof is regarded as an x-axis direction and a direction perpendicular to the x-axis direction is regarded as a y-axis direction, an orientation rate of a crystal ab plane measured by an electron backscatter diffraction method is at least 55% in each of the x-axis direction and the y-axis direction.

A fifth aspect of the present invention provides a positive electrode active material for a nonaqueous electrolyte secondary battery, in which the active material is represented by General Formula (2): $Li_{1+u}Ni_xMn_yM_zO_{2+\beta}$ (in Formula (2), M is at least one additional element selected from Co, Ti, V, Cr, Zr, Nb, Mo, Hf, Ta, Fe, and W; and u, x, y, z, and $\beta$ satisfy $-0.05 \leq u \leq 0.5$, $0.1 \leq x \leq 0.8$, $0.1 \leq y \leq 0.6$, $0 \leq z \leq 0.8$, $x+y+z=1.0$, and $0 \leq \beta \leq 0.5$) and contains a secondary particle formed of a plurality of flocculated primary particles; and the primary particles have an aspect ratio of at least 2, and at least some of the primary particles are disposed radially in a direction from a central part of the particle to an outer circumference thereof, a degree of sparsity/density obtained from an image analysis result of a SEM image of a cross section of the secondary particle is at least 0.5% and up to 25%, and a particle strength is at least 70 MPa and up to 100 MPa.

Here, it is preferable that in an area within 50% of a radius of the secondary particle from the outer circumference of the secondary particle toward the central part thereof, at least 50% of the primary particles in number relative to a total number of the primary particles present within this area be disposed radially. In addition, it is preferable that a volume-average particle diameter MV be at least 5 µm and up to 20 µm, and [(D90−D10)/average particle diameter] that is an indicator to represent spread of a particle size distribution be at least 0.7.

A sixth aspect of the present invention provides a non-aqueous electrolyte secondary battery having a positive electrode that includes the positive electrode active material for a nonaqueous electrolyte secondary.

Advantageous Effects of the Invention

When the nickel-manganese composite hydroxide of the present invention is used as the precursor, the positive electrode active material for a nonaqueous electrolyte secondary battery having a high battery capacity, a high output characteristic, and an excellent cycle characteristic can be obtained; and the nonaqueous electrolyte secondary battery having a positive electrode including the positive electrode active material can be high in the capacity and the output, and can have a long life. In addition, the methods for producing the nickel-manganese composite hydroxide and the positive electrode active material can be easily carried out even in an industrial scale; and thus, industrial values of them are extremely high.

DESCRIPTION OF EMBODIMENTS

Figure 1A:
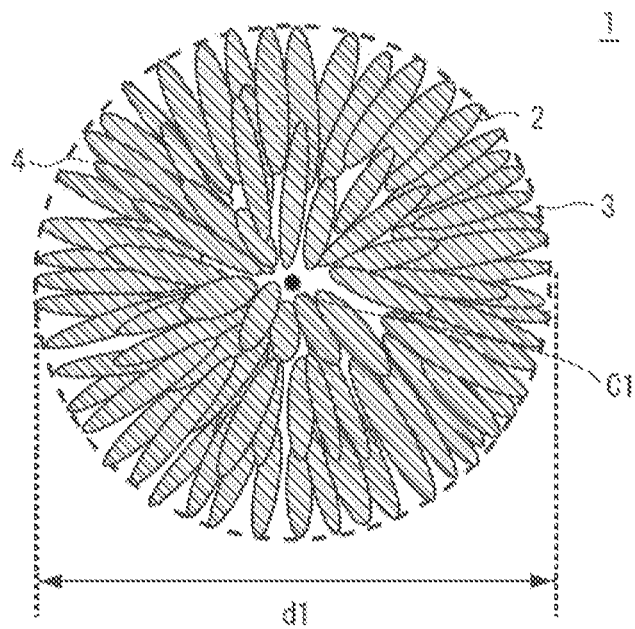
FIG. 1(A) is a schematic diagram illustrating one example of the nickel-manganese composite hydroxide of the present embodiment.

Hereinafter, with referring to the drawings, in-depth explanation will be given to a nickel-manganese hydroxide of the present embodiment and a method for producing the same, and a positive electrode active material for a nonaqueous electrolyte secondary battery and a method for producing the same. It should be note that in order to promote understanding of each component more easily, the drawings are represented while emphasizing or omitting some parts thereof; and thus, the structure, shape, drawing scale, or the like may be different from those of the actual ones.

1. Nickel-Manganese Composite Hydroxide

Figure 1B:
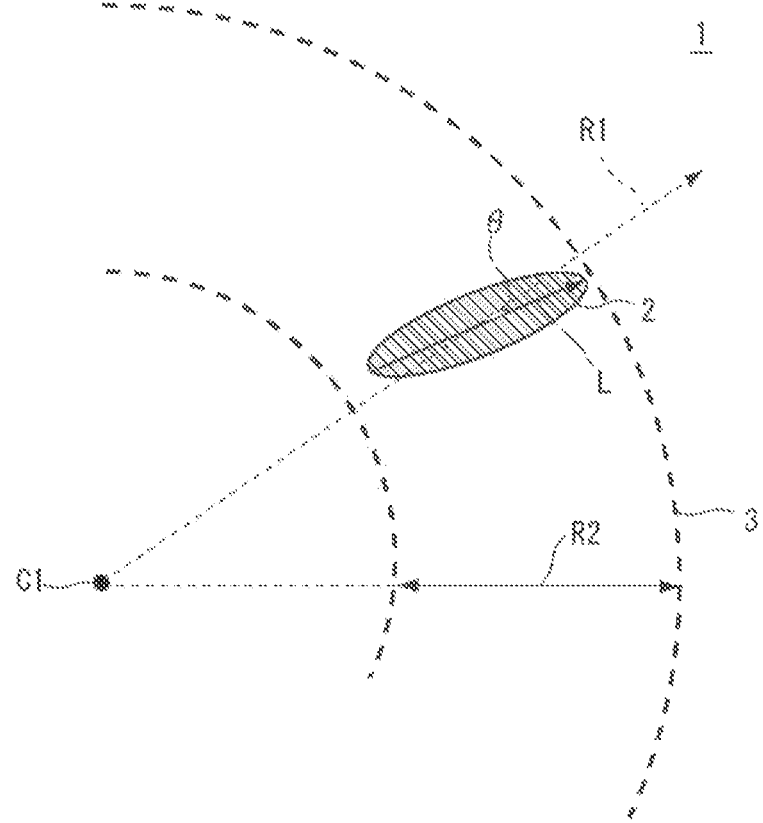
FIG. 1(B) is an enlarged schematic diagram of part of the nickel-manganese composite hydroxide.

FIG. 1(A) is a schematic diagram illustrating one example of the nickel-manganese composite hydroxide 1 of the present embodiment (hereinafter, this is also referred to as "composite hydroxide 1"); and FIG. 1(B) is an enlarged drawing of part of the composite hydroxide 1 in order to explain disposition of the primary particle 2. As illustrated in FIG. 1(A), the composite hydroxide 1 contains the secondary particle 3 formed of a plurality of flocculated primary particles 2. The primary particle 2 in the composite hydroxide 1 has a certain average aspect ratio, and at least some of the primary particles 2 are disposed radially in a direction from the central part C1 of the secondary particle 3 to the outer circumference thereof. Here, note that the composite hydroxide 1 may include a small amount of the independent primary particles 2 such as, for example, the primary particles 2 that are not flocculated as the secondary particle 3 and the primary particles 2 that are dropped off from the secondary particle 3 after having been flocculated.

As will be described later, the composite hydroxide 1 can be suitably used as a precursor of the positive electrode active material 10 for a nonaqueous electrolyte secondary battery (hereinafter, this material for a nonaqueous electrolyte secondary battery is also referred to as "positive electrode active material 10". See FIG. 3). The inner structure of the secondary particle 3 of the composite hydroxide 1 can have a significant influence on the inner structure of the secondary particle 13 of the positive electrode active material 10. Therefore, when the inner structure of the secondary particle 3 of the composite hydroxide 1 is made to the one as described above, the positive electrode active material 10 to be obtained therefrom can also have the structure in which at least some of the primary particles are disposed radially in a direction from the central part C2 of the secondary particle 13 to the outer circumference thereof; and thus, when used in the positive electrode of the battery, high charging and discharging capacities (hereinafter, these capacities are also referred to as "battery capacity"), an excellent output characteristic, and an excellent cycle characteristic (hereinafter, this is also referred to as "durability") can be obtained.

The composite hydroxide 1 is represented by General Formula (1): $Ni_xMn_yM_z(OH)_{2+\alpha}$. In Formula (1), M is at least one element selected from Co, Ti, V, Cr, Zr, Nb, Mo, Hf, Ta, Fe, and W; and x, y, and z satisfy $0.1 \leq x \leq 0.8$, $0.1 \leq y \leq 0.6$, $0 \leq z \leq 0.8$, and $x+y+z=1.0$. In Formula (1), $\alpha$ satisfies $0 \leq \alpha \leq 0.4$ and is a coefficient that varies with the valencies of the metal elements (Ni, Mn, and M) included in the composite hydroxide 1.

In Formula (1), x indicates the content of Ni and satisfies $0.1 \leq x \leq 0.8$, and preferably $0.15 \leq x \leq 0.6$. When the value of x is within the range described above, the primary particle 2 that is disposed radially can be readily obtained. In Formula (1), y indicates the content of Mn and satisfies $0.1 \leq y \leq 0.6$, and preferably $0.1 \leq y \leq 0.4$. When the value of y is within the range described above, the shape and disposition of the primary particle 2 can be controlled within the intended ranges as described later. Here, as will be described later, in view of controlling the crystal orientation of the positive electrode active material to be obtained, the characters x, y, and z in General Formula (1) may also be $0.1 \leq x \leq 0.9$, $0.03 \leq x \leq 0.6$, and $0 \leq z \leq 0.8$, respectively.

In Formula (1), when z of M is $z > 0$, the requirements to various battery characteristics can be satisfied. For example, when M includes Co, the battery capacity and the output characteristic can be further enhanced. When M is Co, z preferably satisfies $0.1 \leq z \leq 0.35$.

As will be described later, after the composite hydroxide 1 is mixed with a lithium compound, a resulting mixture is fired to form the positive electrode active material 10. Therefore, the composition of the composite hydroxide 1 is succeeded to the composition of the positive electrode active material 10 except for lithium. Accordingly, the composition of the composite hydroxide 1 may be made to the same as the metal composition, but except for lithium, of the positive electrode active material 10 to be obtained.

The average aspect ratio of the primary particle 2 that constitutes the composite hydroxide 1 is at least 3, and preferably at least 5. The average aspect ratio of the primary particle 2 is the ratio of the long diameter to the short diameter of the primary particle 2 (long diameter/short diameter). When the aspect ratio of the primary particle 2 is made within the range described above, orientation of the primary particle 2 in the radial direction R1 can be increased, so that the secondary particle 3 having a radial structure in which the primary particles 2 are disposed radially can be obtained. With this, in the positive electrode active material 10 obtained by using the composite hydroxide 1 as the precursor thereof, the aspect ratio of the primary particle 12 that constitutes the secondary particle 13 can be made to at least 2; and thus, in the secondary particle 13 of the positive electrode active material 10, too, the orientation of the primary particle 12 in the radial direction R1 can be ensured, so that the particle structure in which the primary articles 12 are disposed radially can be obtained. In view of the degree of sparsity/density of the particle, the aspect ratio is preferably up to 20.

The aspect ratio of the primary particle 2 can be measured by observing the cross section of the secondary particle 3 with a scanning electron microscope (hereinafter, this is also referred to as "SEM"). In observation of the cross section of the secondary particle 3, first, the composite hydroxide 1 is buried into a resin or the like, and then, it is, for example, cut to prepare the cross section sample of the secondary particle 3, and then, the cross sections of a plurality of secondary particles 3 are observed. With regard to the secondary particle 3 to be observed, 20 particles are arbitrarily (randomly) selected in which the maximum distance d between two points on the outer circumference of the cross section of one secondary particle 3 (see FIGS. 1(A) and 1(B)) is at least 80% of the volume-average particle diameter (MV) in the cross section of a plurality of secondary particles 3, the volume-average particle diameter being measured using a laser diffraction scattering particle size analyzer. Next, from each of the secondary particles 3 thereby selected, 50 primary particles 2 are further selected arbitrarily (randomly). The long diameter and the short diameter of the primary particle 2 thereby selected are measured to obtain the aspect ratio (long diameter/short diameter). Here, for example, the long diameter is a maximum diameter of the cross section of the primary particle 2 observed with SEM; and the short diameter is the longest diameter in the direction perpendicular to the maximum diameter. The aspect ratios of 50 primary particles 2 are number-averaged to calculate the aspect ratio (average) in each secondary particle 3. The aspect ratios of all of 20 secondary particles 3 selected are number-averaged to calculate the aspect ratio (average) of the entire composite hydroxide 1.

The long diameter of the primary particle 2 is not particularly limited so far as the aspect ratio described above is satisfied; it is, for example, at least 400 nm and up to 1,500 nm, and preferably at least 500 nm and up to 1,200 nm. The short diameter of the primary particle 2 is, for example, at least 30 nm and up to 200 nm, and preferably at least 50 nm and up to 130 nm. The primary particle 2 has mainly a plate-like shape; and the shape of the cross section thereof is circular, elliptical, rectangular, and the like.

As can be seen in FIG. 1(A), at least some of the primary particles 2 that constitute the composite hydroxide 1 are disposed radially in a direction from the central part of the secondary particle 3 to the outer circumference thereof. Here, to be disposed radially means, for example, as can be seen in FIG. 1(B), the state in which the direction of the long diameter L of the primary particle 2 in the cross section of the composite hydroxide 1 is orientated in the radial direction R1 from the central part C1 of the secondary particle 3 to the outer circumference thereof. Here, to be orientated in the radial direction R1 means that in the cross section of the composite hydroxide 1, the angle difference θ between the direction of the long diameter L of the primary particle 2 and the radial direction R1 is up to 45°, and preferably up to 30°. As can be seen, for example, in FIG. 1(B), the angle difference θ between the direction of the long diameter L of the primary particle 2 and the radial direction R1 may be obtained from the angle between, among the radial directions from the central part C1 of the secondary particle 3 to the outer circumference thereof, the radial direction R1 that passes through the center of the long diameter and the direction of the long diameter L, in which the direction of the long diameter L is the direction from one end near the central part of the secondary particle 3 to the other end in the long diameter of the primary particle 2.

In addition, it is preferable that in the region R2 that is 50% of the radius from the outer circumference of the secondary particle 3 to the central part C1 of the particle, at least 50% of the primary particles 2 in number relative to the total number of the primary particles 2 that are present in the 50% region be radially disposed. With this, the positive electrode active material 10 to be obtained can have the particle structure having a further enhanced radial orientation; and thus, when used in the positive electrode of the battery, the battery characteristics can be enhanced. In view of further enhancement of the battery characteristics, it is preferable that at least 70% of the primary particles 2 be radially orientated in the 50% region.

The ratio of the primary particles 2 that are radially disposed can be measured by observing the cross section of the secondary particle 3 by a scanning electron microscope (hereinafter, this is also referred to as "SEM"). Namely, in a similar manner to the measurement of the aspect ratio, at least 20 of the secondary particle 3 that is at least 80% of the volume-average particle diameter (MV) are selected in the cross section observation. In the secondary particles 3 thus selected, 50 primary particles 2 that are present in the region R2 that is 50% of the radius from the outer circumference of the secondary particle 3 to the central part C of the particle (whole of the primary particle 2 is included in the 50% radius region) are arbitrarily (randomly) selected; and in each of the secondary particles 3, the number (N1) of the primary particles 2 in which the direction of the long diameter L is disposed radially are measured thereby calculating the ratio of the primary particles 2 that are radially disposed ([N1/50]×100) (%). Then, by calculating the number-average ratio of the primary particles 2 that are radially disposed, the above-mentioned value can be measured. When, in at least 80% of the measured secondary particles 3 (for example, at least 16 particles when 20 particles are measured), the ratio of the primary particles 2 that are radially disposed is at least 50%, it can be judged that the composite hydroxide 1 has the particle structure that the particles are radially orientated as a whole (radial structure).

The secondary particle 3 that constitutes the composite hydroxide 1 has the ratio (I(101)/I(001)) of the diffraction peak intensity I(101) of the 101 plane to the diffraction peak intensity I(001) of the 001 plane (hereinafter, this ratio is also referred to as "peak intensity ratio"), measured by an X-ray diffraction measurement, of up to 0.15. The peak intensity indicates the orientation of each of the crystal planes. When the peak intensity ratio is up to 0.15, the aspect ratio of the primary particle 2 tends to become larger so that the composite hydroxide 1 tends to have the radial structure. In view of radially disposing the primary particle 2 furthermore thereby enhancing the orientation of the crystal plane, the peak intensity ratio is preferably up to 0.135. Here, the lower limit of the peak intensity ratio is not particularly limited, and it is, for example, at least 0.03.

In the composite hydroxide 1, it is preferable that a total pore volume in a pore volume distribution be at least 0.015 $cm^3/g$ and up to 0.03 $cm^3/g$. In addition, in the composite hydroxide 1, it is preferable that the ratio (dV(log r)) of the pore volume having the pore size of up to 40 nm to the total pore volume be at least 50%. When the pore volume distribution is made within the range described above, sintering among the primary particles of the positive electrode active material can be suppressed so that the strength of the secondary particle can be made appropriate. In addition, an increase in the resistance, a decrease in the capacity, and cracking of particles can be suppressed, these being caused by a decrease in the specific surface area when this is made to the positive electrode active material 10, so that the cycle characteristic can be enhanced furthermore. The pore volume distribution may be measured by a nitrogen adsorption method.

In the composite hydroxide 1, the degree of sparsity/density is preferably at least 0.5% and up to 25%, more preferably at least 1.0% and up to 10%, while far preferably at least 2.0% and up to 7%. With this, the degree of sparsity/density of the positive electrode active material to be obtained can also be made within the range described above, so that a high battery capacity can be obtained. Here, "the degree of sparsity/density" is the value represented by [(area of the void 4 inside the secondary particle 3/area of the cross section of the secondary particle 3)×100](%), obtained, for example, from the image analysis result of the SEM cross section image of the composite hydroxide 1, and this can be represented by [(area of the void 4)/(sum of the area of the cross section of the primary particle 2 and the area of void 4)×100]. Here, as the degree of sparsity/density, an average degree of sparsity/density can be used, in which this can be obtained in such a way that the cross sections of 20 secondary particles 3 that are at least 80% of the volume-average particle diameter (MV) are randomly selected, and the degree of sparsity/density of each cross section of the secondary particle 3 is measured followed by averaging the respective values.

In the composite hydroxide 1, the volume-average particle diameter MV is preferably at least 5 μm and up to 20 μm, and more preferably at least 6 μm and up to 15 μm. Because the volume-average particle diameter of the composite hydroxide is succeeded to the positive electrode active material, by controlling this in the range described above, the volume-average particle diameter MV of the positive electrode active material to be obtained can be controlled in the range of at least 5 μm and up to 20 μm; and thus, the battery using this positive electrode active material can competitively have a high packing density and an excellent output characteristic.

When the volume-average particle diameter MV is less than 5 μm, the fillability of the secondary particle 3 decreases so that when this is made to the positive electrode active material, the battery capacity per weight may be difficult to be increased. On the other hand, when the volume-average particle diameter MV is more than 20 μm, the specific surface area is decreased thereby decreasing the reactivity between the composite hydroxide 1 (precursor) and a lithium compound in the firing process to be described later; and thus, the positive electrode active material having high battery characteristics may not be obtained.

In the nickel-manganese composite hydroxide, [(D90−D10)/average particle diameter] that is a fluctuation indicator of the particle diameter is preferably at least 0.65, and more preferably at least 0.70. When the fluctuation indicator of the nickel-manganese composite hydroxide is within the range described above, fine particles and coarse particles are properly mixed so that the particle fillability can be enhanced while suppressing the decreases in the cycle characteristic and the output characteristic of the positive electrode active material to be obtained. Here, the upper limit of the [(D90−D10)/average particle diameter] is not particularly limited; however, in view of suppressing excessive mixing of the fine particles or the coarse particles into the positive electrode active material, the fluctuation indicator of the nickel-manganese composite hydroxide is preferably up to 1.2, and more preferably up to 1.0.

In the [(D90−D10)/average particle diameter], D10 means the particle diameter at which the cumulative volume reaches 10% of the total volume of the entire particles, the cumulative volume being obtained by accumulating the particle number in each particle diameter from a side of the small particle diameter; and D90 means the particle diameter at which the cumulative volume reaches 90% of the total volume of the entire particles, the cumulative volume being obtained by similarly accumulating the particle number. The average particle diameter is the volume-average particle diameter MV, which means the volume-weighted average particle diameter. The volume-average particle diameter MV, D90, and D10 can be measured by using a laser diffraction scattering particle size analyzer.

2. Production Method of the Nickel-Manganese Composite Hydroxide

Figure 2:
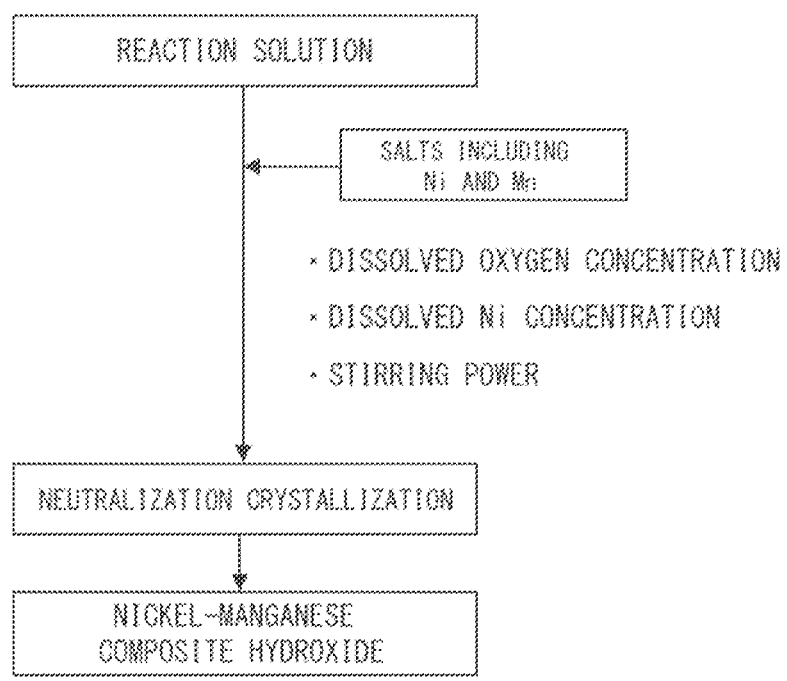
FIG. 2 illustrates one example of the production method of the nickel-manganese composite hydroxide of the present embodiment.

FIG. 2 is a drawing illustrating one example of the production method of the nickel-manganese composite hydroxide of the present embodiment. When explaining FIG. 2, as needed a reference is made to FIGS. 1(A) and 1(B), which are schematic drawings illustrating one example of the nickel-manganese composite hydroxide. As can be seen in FIG. 2, the production method of the composite hydroxide 1 of the present embodiment includes a crystallization process of carrying out co-precipitation by neutralizing a salt containing at least nickel and a salt containing at least manganese in an aqueous reaction solution in a crystallization reaction vessel. In the crystallization process of the present embodiment, it is important to control a dissolved nickel concentration, a dissolved oxygen concentration in the aqueous reaction solution, and a stirring power applied to the aqueous reaction solution within respective certain ranges. By controlling these factors (parameters), the particle structure of the composite hydroxide 1 (secondary particle 3) to be obtained can be controlled.

In the crystallization process, especially because a manganese-containing salt is used, the morphology of the composite hydroxide 1 is susceptible to the dissolved oxygen concentration in the aqueous reaction solution. For example, when the dissolved oxygen concentration in the crystallization process is low, the primary particle 2 has a thick plate-like shape. The composite oxide 1 formed of the primary particle 2 having the thick plate-like shape is prone to decrease the degree of sparsity/density. On the other hand, when the dissolved oxygen concentration is high, the primary particle 2 has a fine needle-like shape or a thin plate-like shape. The composite oxide containing the secondary particle formed of the flocculated primary particles 2, the primary particles having a fine needle-like shape or a thin plate-like shape, is prone to increase the degree of sparsity/density. Accordingly, by appropriately controlling the dissolved oxygen concentration, the morphology (shape) of the primary particle 2 can be controlled; and as a result of it, the degree of sparsity/density of the secondary particle 3 can be controlled. It should be noted that "morphology" is the characters relating to the form and structure of the primary particle 2 and/or the secondary particle 3, in which the characters include the shape, the thickness (aspect ratio), the volume-average particle diameter, the particle size distribution, the crystal structure, the tap density, and the like of the particle.

The inventors of the present invention carried out an extensive investigation about the production condition of the composite hydroxide 1; and as a result of it, it was found that in addition to control of the dissolved oxygen concentration, by further controlling the dissolved nickel concentration in the aqueous reaction solution and the stirring power applied to the aqueous reaction solution, the morphologies of the primary particle 2 and the secondary particle 3 are able to be controlled more accurately. Namely, in the production method of the present embodiment, by controlling the dissolved nickel concentration and the stirring power in accordance with the dissolved oxygen concentration, the particle structure of the composite hydroxide 1 can be controlled thereby enabling to produce the nickel-manganese composite hydroxide that can also be suitably used as the precursor of the positive electrode active material.

Hereinafter, specific embodiments and the like of the conditions in the production method of the present embodiment will be explained.

(Dissolved Oxygen Concentration)

The dissolved oxygen concentration in the aqueous reaction solution is in the range of at least 0.5 mg/L, preferably in the range of at least 0.5 mg/L and up to 8.0 mg/L, preferably in the range of at least 0.5 mg/L and up to 3.5 mg/L, and more preferably in the range of at least 0.5 mg/L and up to 3.0 mg/L. When the dissolved oxygen concentration is controlled within the range described above, the primary particle 2 having the plate-like shape is developed so that the nickel-manganese composite hydroxide 1 having the radial structure can be obtained. In addition, by controlling the degree of sparsity/density of the secondary particle 3 within the desired range, the composite hydroxide that is suitable as the precursor of the positive electrode active material can be obtained.

When the dissolved oxygen concentration in the aqueous reaction solution is less than 0.5 mg/L, in the crystallization reaction, the oxidation of the transition metals is sluggish, especially the oxidation of manganese is suppressed; and as a result, the voids inside the secondary particle 3 to be obtained is decreased thereby leading to an increase in the density, which may result in the particle having a low reactivity with a lithium compound. Therefore, the voids inside the particle of the positive electrode active material to be obtained also decrease, which may result in an increase in the reaction resistance. On the other hand, when the dissolved oxygen concentration is more than 8.0 mg/L, the secondary particle 3 to be formed becomes extremely sparse thereby leading to significant destruction of the particle form, so that the particle fillability is prone to be significantly deteriorated.

In view of controlling the crystal orientation of the lithium-nickel-manganese composite oxide in a further proper range, it is preferable that the dissolved oxygen concentration in the aqueous reaction solution be made in the range of at least 0.6 mg/L and up to 3.0 mg/L. When the dissolved oxygen concentration is within the range described above, the positive electrode active material having a further enhanced battery capacity can be obtained.

In addition, in the crystallization process it is preferable that the dissolved oxygen concentration be controlled so as to be constant. For example, the fluctuation range of the dissolved oxygen concentration is preferably ±0.2 mg/L, and more preferably ±0.1 mg/L.

Here, the dissolved oxygen concentration may be measured by a method such as a Winkler method (chemical analysis method), a diaphragm permeation method (electrochemical measurement method), or a fluorescence measurement method. The same measurement value of the dissolved oxygen concentration can be obtained with these measurement methods; and thus, any method mentioned above may be used.

The dissolved oxygen concentration in the aqueous reaction solution can be adjusted by introducing into a reaction vessel a gas such as an inert gas (for example, $N_2$ gas and Ar gas), an air, or oxygen, with controlling the flow rates or the composition of these gases. Here, these gases may be flowed into the space of the reaction vessel or blown into the aqueous reaction solution. By appropriately stirring the aqueous reaction solution by using the stirring equipment such as a stirring blade with the power within the range to be described later, the dissolved oxygen concentration in the whole aqueous reaction solution can be made further uniform.

(Dissolved Nickel Concentration)

The dissolved nickel concentration (nickel ion concentration) in the aqueous reaction solution is controlled in the range of up to 1,500 mg/L, preferably in the range of at least 10 mg/L and up to 1,500 mg/L, more preferably in the range of at least 300 mg/L and up to 1,500 mg/L, while far preferably in the range of at least 400 mg/L and up to 1,200 mg/L, based on the temperature of the aqueous reaction solution. When the dissolved nickel concentration is controlled within the range described above and other conditions are also optimized, the degree of sparsity/density of the secondary particle and the disposition (crystal direction) of the primary particle 2 can be controlled so that the composite hydroxide 1 having the radial structure can be obtained.

When the nickel concentration in the aqueous reaction solution is less than 10 mg/L, the growth rate of the primary particle 2 is so slow that the nucleus can be readily generated, thereby tending to readily result in the secondary particle 3 having a small particle diameter and a poor sphericity. The secondary particle 3 like this is extremely poor in the particle fillability. When the dissolved nickel concentration is less than 300 mg/L, the growth rate of the primary particle 2 is so fast that the primary particles 2 are randomly disposed, thereby occasionally resulting in a poor development of the radial structure and a decrease in the sphericity of the secondary particle 3 so that the particle fillability (tap density and the like) is deteriorated.

When the dissolved nickel concentration in the aqueous reaction solution is more than 1,500 mg/L, the generation rate of the composite hydroxide 1 is extremely fast so that Ni remains in the filtrate; and thus, the crystallization amount of Ni is shifted from the intended composition so that the mixed hydroxide having an intended ratio may not be obtained. In addition, when the dissolved nickel concentration is more than 1,500 mg/L, impurities included in the composite hydroxide significantly increase thereby leading to deterioration of the battery characteristics when the positive electrode active material obtained from the composite hydroxide is used in the battery.

The dissolved nickel concentration may be controlled by adjusting pH or concentration of a complexing agent such as, for example, concentration of an ammonium ion in the aqueous reaction solution with controlling the temperature of the aqueous reaction solution and the atmosphere inside the reaction vessel within respective certain ranges. In addition, in the crystallization process it is preferable to control the dissolved nickel concentration so as to be constant. The fluctuation range of the dissolved nickel concentration may be made, for example, within ±20 mg/L. The dissolved nickel concentration may be measured by chemically analyzing the Ni amount in a liquid component of the aqueous reaction solution, for example, with an ICP emission spectrometry.

(Stirring Power)

The stirring power loaded to the aqueous reaction solution is made, for example, in the range of at least 4 kW/m$^3$ and up to 8 kW/m$^3$, and preferably in the range of at least 5 kW/m$^3$ and up to 7.5 kW/m$^3$. When the stirring power is made within the range described above, excessive refinement or coarsening of the secondary particle 3 can be suppressed so that the particle structure of the composite hydroxide 1 can be made radial, and that the degree of sparsity/density and the particle size distribution can be made suitable. In the crystallization process, it is preferable that the stirring power be controlled so as to be constant. The fluctuation range of the stirring power may be made, for example, within ±0.2 kW/m$^3$. The stirring power is controlled within the range described above by adjusting the size, the rotation number, and the like of the stirring equipment such as a stirring blade disposed in the reaction vessel.

(Reaction Temperature)

The temperature of the aqueous reaction solution inside the crystallization reaction vessel is preferably in the range of at least 35° C. and up to 60° C., and more preferably in the range of at least 38° C. and up to 50° C. When the temperature of the aqueous reaction solution is higher than 60° C., priority of the nucleus generation versus the particle growth in the aqueous reaction solution rises, so that the shape of the primary particle 2 that constitutes the composite hydroxide 1 may be too fine. When the composite hydroxide 1 like this is used, there is a problem in that the fillability of the positive electrode active material 10 to be obtained is deteriorated. On the other hand, when the temperature of the aqueous reaction solution is lower than 35° C., there is a tendency that the particle growth is more dominant than the nucleus generation in the aqueous reaction solution; and thus, the shapes of the primary particle 2 and the secondary particle 3 that constitute the composite hydroxide 1 are prone to be coarse. When the composite hydroxide 1 having the coarse secondary particle 3 like this is used as the precursor of the positive electrode active material 10, there is a problem in that the positive electrode active material containing particles that are so large and coarse that irregular surface is generated when producing the electrode is formed. In addition, when the temperature of the aqueous reaction solution is lower than 35° C., there is a problem of a very poor reaction efficiency because remaining amounts of the metal ions in the aqueous reaction solution are so high; and moreover, the problem is prone to be caused that the composite hydroxide including large amounts of impurity elements is formed.

(pH Value)

The pH value of the aqueous reaction solution is preferably in the range of at least 10.0 and up to 13.0 based on the solution temperature at 25° C. When the pH value is within the range described above, morphology of the secondary particle can be properly controlled with controlling the size and shape of the primary particle 2 thereby controlling the degree of sparsity/density in the intended range, so that the composite hydroxide that is further suitable as the precursor of the positive electrode active material can be obtained. When the pH value is less than 10.0, the generation rate of the composite hydroxide 1 becomes extremely slow so that nickel remains in the filtrate thereby occasionally causing significant deviation of the composition of the obtained composite hydroxide from the target values thereof. On the other hand, when the pH value is more than 13.0, the particle growth rate is so fast that the nucleus can be readily generated thereby readily tending to the particle having a small particle diameter and a poor sphericity.

(Other Conditions)

The production method of the present embodiment includes the crystallization process of forming the nickel-manganese composite hydroxide particle by neutralizing the salts including at least nickel and manganese in the aqueous reaction solution. In the specific embodiment of the crystallization process, for example, the pH value is controlled by neutralization with an addition of a neutralizing agent (for example, an alkali solution or the like) to a mixed aqueous solution including at least nickel (Ni) and manganese (Mn) in the reaction vessel with stirring the mixed solution, so that particles of the composite hydroxide 1 can be formed by co-precipitation.

In the production method of the present embodiment, any of a crystallization method based on a batch method and a continuous crystallization method may be employed. Here, the continuous crystallization method is the crystallization method in which while continuously feeding the mixed aqueous solution described above, pH is controlled by feeding the neutralizing agent, whereby the composite hydroxide particles thus produced is recovered by overflowing. In the continuous crystallization method, particles having a broader particle size distribution as compared with the batch method can be obtained, so that the particles having a high fillability are prone to be obtained. In addition, the continuous crystallization method is suitable for mass production, so that this is an industrially advantageous production method, too. For example, when production of the composite hydroxide of the present embodiment is carried out by the continuous crystallization method, the fillability (tap density) of the composite hydroxide particles to be obtained can be improved furthermore, so that the composite hydroxide 1 having further improved fillability and degree of sparsity/density can be produced conveniently and massively.

In the crystallization process, in the case where the continuous crystallization method is employed, the residence time of the mixed aqueous solution in the reaction vessel is preferably in the range of 3 to 15 hours, and more preferably in the range of 5 to 12 hours. Here, the residence time represents the period during which the mixed aqueous solution stays in the reaction vessel after it is dropped into the vessel; and thus, this can be obtained by dividing the volume of the reaction vessel with the feeding rate of the mixed aqueous solution. For example, if the mixed aqueous solution is dropped into a 50-L reaction vessel with the feeding rate of 50 mL/min, the residence time of the mixed aqueous solution in the vessel is about 16 hours. The residence time has an influence on the particle growth and the production amount. When the residence time is shorter than 3 hours, not only the sphericity deteriorates but also the particle diameter of the composite hydroxide may be too small. On the other hand, when the residence time is longer than 15 hours, growth of not only the secondary particle but also the primary particle is prone to be significantly facilitated, so that it becomes difficult to obtain the secondary particle having the primary particles orientated radially. In addition, when the residence time is longer than 15 hours, the specific surface area of the secondary particle 3 to be obtained is prone to be so small that the reactivity with the Li compound may decrease and the productivity may significantly decrease.

With regard to the mixed aqueous solution, an aqueous solution including at least nickel and manganese, namely, an aqueous solution having at least a nickel salt and a manganese salt dissolved therein may be used. The mixed aqueous solution may further include M; and thus, an aqueous solution having a nickel salt, a manganese salt, and an M-including salt dissolved therein may be used. With regard to the nickel salt, the manganese salt, and the M-including salt, for example, at least one salt selected from the group consisting of sulfate, nitrate, and chloride may be used. Among them, in view of a cost as well as a waste water treatment, sulfate salts are preferably used.

Concentration of the mixed aqueous solution is preferably in the range of at least 1.0 mol/L and up to 2.4 mol/L, and more preferably in the range of at least 1.2 mol/L and up to 2.2 mol/L, as a total of the metal salts dissolved therein. When the concentration of the mixed aqueous solution as a total of the metal salts dissolved therein is less than 1.0 mol/L, there is a risk that the primary particle that constitutes the composite hydroxide (secondary particle) does not grow sufficiently well because the concentration is too low. On the other hand, when the concentration of the mixed aqueous solution is more than 2.4 mol/L, because the concentration is higher than a saturated concentration at a normal temperature, there is a risk that crystals are reprecipitated thereby clogging a pipe and so forth. In addition, in this case, the nucleus generation of the primary particle increases so that there is a risk that the ratio of fine particles in the composite hydroxide particles to be obtained increases. Here, the composition of the metal elements included in the mixed aqueous solution coincides with the composition of the metal elements included in the composite hydroxide 1 to be obtained. Accordingly, the composition of the metal elements in the mixed aqueous solution can be adjusted so as to be the same as the composition of the metal elements of the target composite hydroxide 1.

With regard to the neutralizing agent, an alkali solution may be used; for example, an aqueous solution of a general alkali metal hydroxide such as sodium hydroxide or potassium hydroxide may be used. Among them, in view of a cost and a handling easiness, a sodium hydroxide aqueous solution is preferably used. Here, the alkali metal hydroxide may be added directly into the aqueous reaction solution; however, in view of easy control of pH, it is added preferably as the aqueous solution thereof. In this case, concentration of the alkali metal hydroxide aqueous solution is preferably in the range of at least 12% by mass and up to 30% by mass, and more preferably in the range of at least 20% by mass and up to 30% by mass. When concentration of the alkali metal hydroxide aqueous solution is less than 12% by mass, the supply amount thereof to the reaction vessel increases, so that there is a risk of insufficient particle growth. On the other hand, when concentration of the alkali metal hydroxide aqueous solution is more than 30% by mass, the pH value becomes locally high depending on the addition position of the alkali metal hydroxide, so that there is a risk of generation of fine particles.

Together with the neutralizing agent, a complexing agent may also be added into the mixed aqueous solution. The complexing agent is not particularly limited so far as it can form a complex in an aqueous solution by bonding to metal elements such as a nickel ion and a manganese ion. For example, as the complexing agent, an ammonium-ion-providing body may be cited. The ammonium-ion-providing body is not particularly limited; for example, at least one solution selected from the group consisting of an aqueous ammonium solution, an aqueous ammonium sulfate solution, an aqueous ammonium carbonate solution, an aqueous ammonium fluoride solution, and an aqueous ammonium chloride solution may be used. Among these, in view of easy handling, the aqueous ammonium solution is preferably used. In the case when the ammonium-ion-providing body is used, the ammonium ion concentration is made preferably in the range of at least 5 g/L and up to 25 g/L.

In the production method of the present embodiment, it is preferable to include a washing process after the crystallization process. This washing process is a process of washing out the impurities included in the composite hydroxide 1 obtained in the crystallization process with a washing solution. It is preferable to use purified water as the washing solution. The amount of the washing solution is preferably, for example, at least 1 L relative to 300 g of the composite hydroxide 1. When the amount of the washing solution relative to 300 g of the composite hydroxide 1 is less than 1 L, washing thereof is insufficient, so that the impurities may be left in the composite hydroxide 1. The washing may be carried out, for example, by pouring the washing solution such as purified water to a filtration machine such as a filter press. In the case when $SO_4$ that is left in the composite oxide 1 is wanted to be washed out furthermore, it is preferable to use sodium hydroxide, sodium carbonate, or the like as the washing solution.

Figure 3:
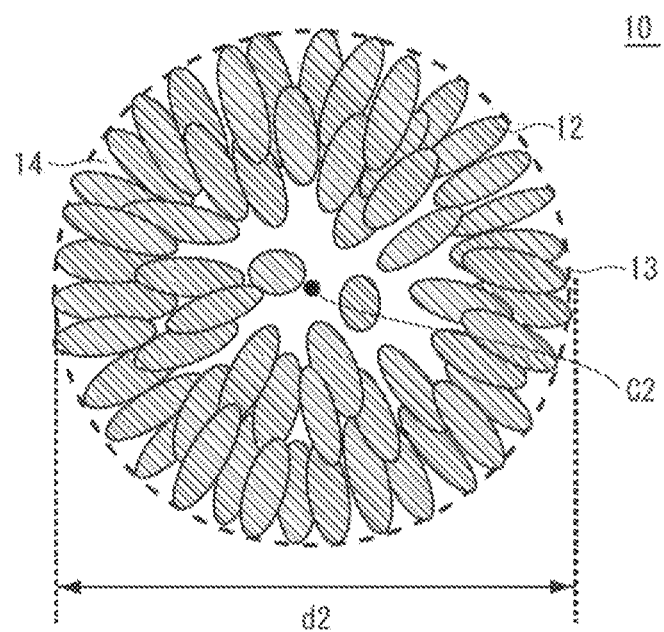
FIG. 3 is a schematic diagram illustrating one example of the nonaqueous positive electrode active material of the present embodiment.

3. Positive Electrode Active Material for a Nonaqueous Electrolyte Secondary Battery FIG. 3 is a drawing illustrating one example of the positive electrode active material 10 for a nonaqueous electrolyte secondary battery of the present embodiment (hereinafter, this material for a nonaqueous electrolyte secondary battery is also referred to as "positive electrode active material 10"). The positive electrode active material 10 can be represented by General Formula (2): $Li_{1+u}Ni_xM-n_yM_zO_{2+\beta}$ (in Formula (2), M is at least one additional element selected from Co, Ti, V, Cr, Zr, Nb, Mo, Hf, Ta, Fe, and W; and u, X, y, z, and β satisfy $-0.05 \leq u \leq 0.5$, $0.1 \leq x \leq 0.8$, $0.1 \leq y \leq 0.6$, $0 \leq z \leq 0.8$, $x+y+z=1.0$, and $0 \leq \beta \leq 0.5$). In Formula (2), β is a coefficient that varies in accordance with the ratio of the lithium atom to the metal elements other than lithium included in the positive electrode active material 10 and with the valencies of the metal elements other than lithium.

As can be seen in FIG. 3, the positive electrode active material 10 contains the secondary particle 13 formed of a plurality of flocculated primary particles 12. Although the positive electrode active material 10 mainly contains the secondary particle 13 formed of a plurality of flocculated primary particles 12, this may also include small amount of the primary particle 2 that is present independently, as in the case of the composite hydroxide 1.

As in the case of the composite hydroxide 1, the positive electrode active material 10 has the particle structure in which at least some of the primary particles 12 are disposed radially in a direction from the central part of the secondary particle 13 to the outer circumference thereof (radial structure). The aspect ratio of a plurality of primary particles 12 is preferably at least 2. It is preferable that at least some of the primary particles 12 be disposed radially from the central part of the secondary particle 13 to the outer circumference thereof.

Because the positive electrode active material 10 has the radial structure, the electrolyte solution can readily penetrate into inside the positive electrode active material 10; and in addition, the stress load caused by expansion and shrinkage of the positive electrode active material upon charging and discharging can be relaxed in the particle boundary of the primary particles 12; and thus, the cycle characteristic can be enhanced. Namely, in the primary particle 12, the expansion and shrinkage increases from the central part C2 toward the outer circumference thereby decreasing the stress that is accumulated in the secondary particle 13; and thus, destruction of the secondary particle 13 is reduced so that the cycle characteristic is enhanced. Because of this, when the positive electrode active material 10 is used in the positive electrode of the secondary battery, high charging and discharging capacities (hereinafter, these capacities are also referred to as "battery capacity") as well as an excellent cycle characteristic (hereinafter, this is also referred to as "durability") can be exhibited.

Figure 4A:
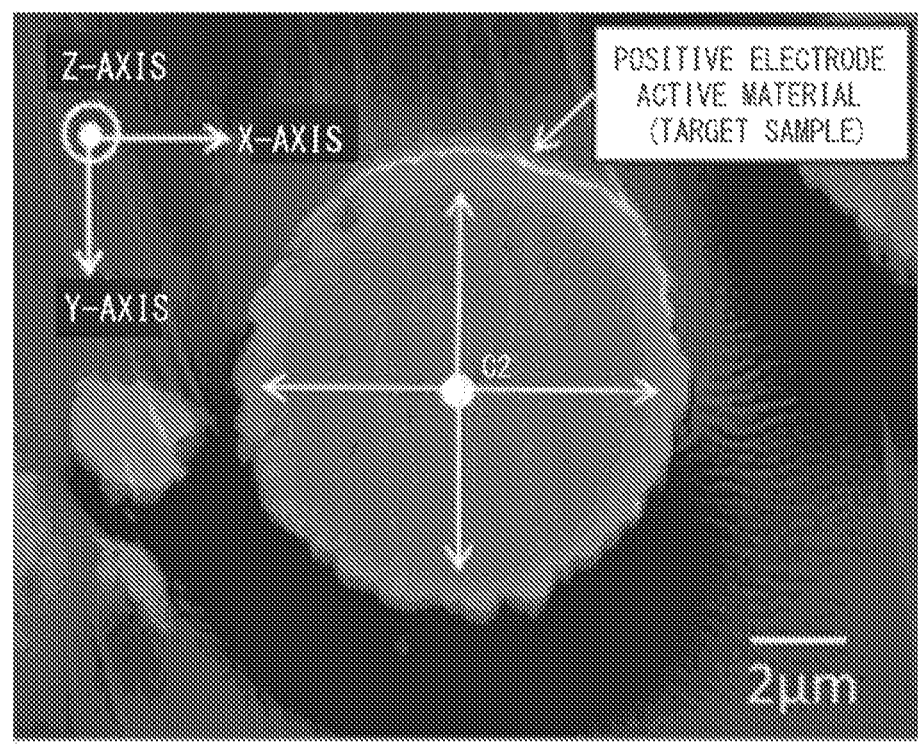
FIGS. 4(A) and 4(B) are drawings to explain the evaluation method of the crystal orientation of the positive electrode active material by using the electron backscatter diffraction method (EBSD).
Figure 4B:
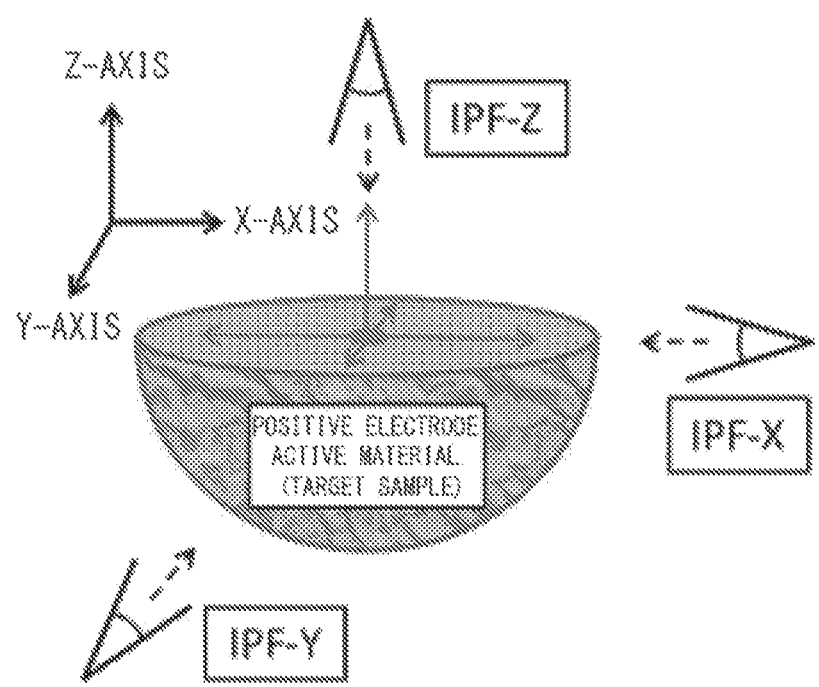

FIG. 4(A) and FIG. 4(B) are the drawings to explain the evaluation method of the crystal orientation of the positive electrode active material 10 by using the electron backscatter diffraction method (EBSD). In EBSD, by using a scanning electron microscope (SEM), an electron beam is irradiated to a sample, and the Kikuchi pattern thereby formed in the sample's plane to be measured due to a diffraction phenomenon of the electron beam is analyzed so that the crystal direction and the like of a minute portion thereof can be measured. By analyzing the crystal direction measured by EBSD, the crystal orientation in a specific direction can be evaluated.

In this specification, an arbitrary radial direction from a center C2 of a cross section of the secondary particle 13, which constitutes the positive electrode active material 10, toward an outer circumference thereof is regarded as an x-axis direction and a direction perpendicular to the x-axis direction is regarded as a y-axis direction; and whereby an evaluation of the crystal orientation using EBSD is carried out. Hereinafter, each direction will be explained by referring to FIG. 4(A).

For example, as illustrated in FIG. 4(A), when the observation cross section is regarded as the paper surface, the x-axis direction in the cross section of the secondary particle 13 is the direction toward a horizontal direction from the center C2 in the observation cross section. Also, when the observation cross section is regarded as the paper surface, the y-axis direction in the cross section of the secondary particle 13 is the direction toward a perpendicular direction from the center C2 in the observation cross section. The z-axis direction is the vertical direction from the center C2 in the observation cross section.

In the positive electrode active material 10 according to the present embodiment, the orientation rate of the crystal ab plane measured by EBSD is preferably at least 55% in each of the x-axis direction and the y-axis direction. In addition, it is more preferable that the orientation rate of the crystal ab plane be at least 80% in at least one of the x-axis direction and the y-axis direction. When the orientation rate of the crystal ab plane is within the range described above, the battery capacity can be enhanced furthermore. Here, the upper limit of the orientation rate of the crystal ab plane is not particularly limited, and it is up to 95%.

The lithium-nickel-manganese composite oxide (positive electrode active material 10) has a hexagonal crystal structure, and it also has a layered structure in which a transition metal ion layer formed of nickel, manganese, and the like and a lithium ion layer are alternately stacked in a c-axis direction. Here, when the secondary battery is charged and discharged, the lithium ion in the crystal that constitutes the positive electrode active material 10 migrates to a [100]-axis direction or a [110]-axis direction (ab plane), and thereby the lithium ion is inserted and de-inserted. Accordingly, although the detail is not yet clear, it is presumed that when the orientation rates of the crystal ab plane in the x-axis direction and the y-axis direction each are within the range described above, the lithium ion can be inserted and de-inserted further readily in the positive electrode active material 10 thereby leading to further enhancement of the battery capacity.

On the other hand, in the positive electrode active material having the structure in which the primary particles are randomly flocculated, for example, as described in Comparative Examples to be described later (see FIG. 7(B)), the orientation rate of the crystal ab plane in at least one of the x-axis direction and the y-axis direction is less than 55%, while the orientation rate in the c-axis direction increases. In this case, the battery capacity may be insufficient in the positive electrode active material 10 in the secondary battery (positive electrode).

Here, EBSD-based evaluation is carried out as follows. Namely, in the cross section observation of the secondary particle 13, at least 3 of the secondary particle 13 that is at least 80% of the volume-average particle diameter (MV) are selected; and the orientation rates of the ab plane in the x-axis direction and the y-axis direction of each particle are measured followed by averaging these measured values. With regard to a specific EBSD-based evaluation method, the method described in Example to be described later may be used.

In the primary particle 12, it is preferable that in the area within 50% of the radius from the outer circumference of the secondary particle toward the central part C2 of the particle, at least 50% of the primary particles 12 in number be disposed radially in the direction from the center side of the particle toward the outer circumference thereof. With this, the positive electrode active material 10 can have the particle structure having a further enhanced radial orientation (radial structure) so that the battery characteristics can be further enhanced when used in the positive electrode of the battery. In order to enhance the battery characteristics furthermore, it is more preferable that at least 70% of the primary particles in number in the 50% region be disposed radially.

The aspect ratio of the primary particle 12, namely the ratio of the long diameter to the short diameter of the primary particle 12 (long diameter/short diameter) is more preferably at least 2. When the aspect ratio is made to at least 2, orientation of the primary particle 12 of the positive electrode active material 10 can be enhanced, so that the secondary particle 13 can have the radial structure. In view of the degree of sparsity/density of the secondary particle 13, the aspect ratio is preferably up to 20, and more preferably up to 10. The particle structure of the primary particle 12, namely, the disposition and the aspect ratio of the primary particle 12 can be measured by observation of the cross section of the secondary particle 13 with a scanning electron microscope, as in the case of the composite hydroxide 1.

The long diameter of the primary particle 12 is not particularly limited so far as the aspect ratio described above is satisfied. The long diameter is, for example, at least 500 nm and up to 1,500 nm, and preferably at least 600 nm and up to 1,400 nm. The short diameter of the primary particle 12 is, for example, at least 200 nm and up to 500 nm, and preferably at least 250 nm and up to 400 nm. The primary particle 12 has mainly a plate-like shape; and the shape of the cross section thereof is circular, elliptical, rectangular, and so forth.

In the positive electrode active material 10, the particle strength is at least 70 MPa and up to 100 MPa, and preferably at least 75 MPa and up to 95 MPa. With this, while having an enough strength to resist the stress that is generated by the expansion and shrinkage caused by charging and discharging, the stress can be relaxed by releasing the generated stress, so that the cycle characteristic can be enhanced. The particle strength can be measured by applying a load to the particle with an indenter using a micro-strength assessment apparatus followed by calculation of the particle strength at the time when the particle is broken.

In the positive electrode active material 10, the degree of sparsity/density is preferably at least 0.5% and up to 25%, and more preferably at least 1.0% and up to 10. With this, the penetration of the electrolyte solution into inside the secondary particle as well as the relaxation of the stress generated by the expansion and shrinkage caused by charging and discharging can be improved. Here, "the degree of sparsity/density" is, for example, the value represented by [(area of the void 4 inside the secondary particle 3/area of the cross section of the secondary particle 3)×100](%), obtained from the image analysis result of the cross section SEM image of the positive electrode active material 10. The degree of sparsity/density may be obtained in the same way as the method for measurement of the degree of sparsity/density of the composite hydroxide 1.

In the positive electrode active material 10, the volume-average particle diameter MV is preferably at least 5 μm and up to 20 μm, and more preferably at least 6 μm and up to 15 μm. With this, the decrease in the specific surface area can be suppressed while retaining the fillability high; and thus, the battery using this positive electrode active material can be competitive in the high packing density and the excellent output characteristic.

In the positive electrode active material 10, [(D90−D10)/average particle diameter] that is an indicator to represent fluctuation of the particle diameter is preferably at least 0.70. When the fluctuation indicator of the nickel-manganese composite hydroxide is within the range described above, fine particles and coarse particles are mixed to a suitable degree; and thus, the particle fill ability can be enhanced with suppressing deterioration of the cycle characteristic and the output characteristic of the positive electrode active material to be obtained. In view of suppressing excessive mixing of the fine particles or the coarse particles into the positive electrode active material, the fluctuation indicator of the nickel-manganese composite hydroxide is preferably up to 1.2, and more preferably up to 1.0.

In the positive electrode active material 10, the tap density is preferably at least 2.3 g/cm³ and up to 2.8 g/cm³, and more preferably at least 2.4 g/cm³ and up to 2.7 g/cm³. When the tap density is within the range described above, the fillability becomes excellent, and thus, the battery capacity can be enhanced.

4. Method for Producing the Positive Electrode Active Material for a Nonaqueous Electrolyte Secondary Battery The production method of the present embodiment is the method for producing the positive electrode active material including the lithium-nickel-manganese composite oxide represented by General Formula (2): $Li_{1+u}Ni_xMn_yM_zO_{2+\beta}$ (in Formula (2), M is at least one additional element selected from Co, Ti, V, Cr, Zr, Nb, Mo, Hf, Ta, Fe, and W; and u, x, y, z, and β satisfy −0.05≤u≤0.5, 0.1≤x≤0.8, 0.1≤y≤0.6, 0≤z≤0.8, x+y+z=1.0, and 0≤β≤0.5) and containing the secondary particle formed of a plurality of flocculated primary particles.

Figure 5:
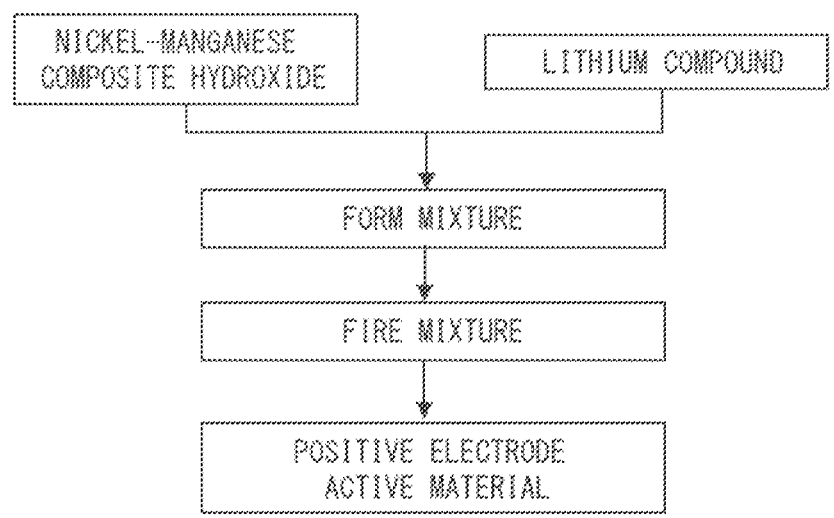
FIG. 5 is a drawing illustrating one example of the production method of the nonaqueous positive electrode active material of the present embodiment.

FIG. 5 is a drawing illustrating one example of the production method of the positive electrode active material for a nonaqueous electrolyte secondary battery of the present embodiment (hereinafter, this material for a nonaqueous electrolyte secondary battery is also referred to as "positive electrode active material"). As illustrated in FIG. 5, the production method includes a process of mixing the composite hydroxide 1 produced by the production method described above with a lithium compound to obtain a mixture of these and a firing process of firing the mixture to obtain a lithium-nickel-manganese composite oxide. When the positive electrode active material 10 that is obtained using the composite hydroxide 1 as the precursor thereof is used in the secondary battery, the battery capacity, the output characteristic, and the cycle characteristic are so good that the industrial value thereof is very high. Hereinafter, the production method of the positive electrode active material 10 will be explained.

Here, the precursor of the positive electrode active material 10 may include, besides the composite hydroxide 1, a small amount of the independent primary particle 2 such as, for example, the primary particle 2 that is not flocculated as the secondary particle 3 and the primary particle 2 that is dropped off from the secondary particle 3 after having been flocculated; and in addition, the precursor may include compounds other than the composite hydroxide 1 of the present embodiment, such as, for example, a nickel composite hydroxide, so far as the effects of the present invention are not impaired by the addition thereof.

(Mixing Process)

First, the composite hydroxide 1 is mixed with a lithium compound to form a mixture of these. The lithium compound is not particularly limited, and heretofore known lithium compounds may be used. For example, in view of easy availability, lithium hydroxide, lithium nitrate, lithium carbonate, lithium chloride, or a mixture of these may be preferably used. Among them, in view of easy handling, stable quality, and low contamination of impurities, lithium hydroxide and lithium carbonate are more preferable as the lithium compound. Prior to the mixing process, the composite hydroxide 1 may be oxidized thereby converting at least part thereof to a nickel-manganese composite oxide, and then, this may be mixed.

The composite hydroxide 1 and the lithium compound are mixed such that the ratio (Li/Me) of the number of the lithium atom (Li) to the number of metal atoms other than lithium in the lithium mixture, namely, the total atom number of nickel, cobalt, and additional elements other than lithium (Me), may be at least 0.95 and up to 1.50, and preferably at least 0.95 and up to 1.20. Namely, because the Li/Me ratio does not change before and after firing, the mixing ratio of Li/Me in the mixing process becomes the Li/Me ratio in the positive electrode active material; and thus, the mixing is carried out such that the Li/Me ratio in the mixture may be the same as the Li/Me ratio in the positive electrode active material to be obtained.

For mixing, a general mixing machine such as, for example, a shaker mixer, a Lodige mixer, a Julia mixer, a V blender, or the like may be used, so far as the mixing can be sufficiently made such that the shape and structure of the composite oxide 1 is not destroyed.

(Firing Process)

Next, the lithium mixture is fired to obtain the lithium-nickel-manganese composite oxide. Firing is carried out, for example, in an oxidative atmosphere at the temperature of at least 700° C. and up to 1100° C., and preferably at least 800° C. and up to 1000° C. When the firing temperature is lower than 700° C., the firing is insufficient so that the tap density may deteriorate. In addition, when the firing temperature is lower than 700° C., diffusion of lithium is insufficient so that excess lithium remains; as a result, the crystal structure may not be well formed, and uniformity of the composition of nickel, manganese, and so forth in the particle is not sufficient, so that satisfactory characteristics may not be obtained when used in the battery. On the other hand, when the firing temperature is higher than 1100° C., a sparse portion in the particle surface may be densified. In addition, when the firing temperature is higher than 1100° C., the lithium-nickel-manganese composite oxide may be severely sintered among the particles thereof, and an abnormal grain growth may take place; and thus, the nearly spherical particle morphology may not be retained because the particles are coarsened after having been fired. In the positive electrode active material like this, the specific surface area thereof is decreased. Therefore, when this is used in the battery, there appears a problem of decrease in the battery capacity due to increase in the positive electrode resistance. In addition, when the firing temperature is higher than 1100° C., the Li site and the transition metal site are mixed so that the battery characteristics may be deteriorated.

The firing time is not particularly limited, and it is at least about 1 hour and up to about 24 hours. It is preferable that the mixture be retained, for example, at the maximum attained temperature of at least 800° C. and up to 1000° C. for a period of at least 2 hours.

In view of uniformly carrying out the reaction between the lithium compound and the composite hydroxide 1 or the nickel-manganese composite oxide obtained by oxidizing the composite hydroxide, the temperature raising rate is preferably, for example, in the range of at least 1° C./minute and up to 10° C./minute until the firing temperature.

In addition, before firing, when the mixture is kept at the temperature around the melting point of the lithium compound for a period of about 1 hour to about 10 hours, the reaction can be carried out further uniformly. For example, before firing, it is preferable that the temperature be raised to at least 650° C. and up to 750° C., the temperature below the firing temperature, and then kept in this temperature range for the period not longer than 6 hours to carry out calcination. When the holding time in calcination is longer than 6 hours, the crystallinity of the lithium-transition metal oxide after having been fired may decrease.

The furnace to be used in firing is not particularly limited, so that any furnace may be used so far as the lithium mixture can be fired in a stream of an air or of oxygen; however, an electric furnace not generating a gas is preferable. Here, any of a batch method and a continuous method may be used.

In the lithium-transition metal composite oxide obtained by firing, sintering among the particles is suppressed; however, occasionally, coarse particles are formed due to light sintering or flocculation. In this case, additionally the lithium-nickel-manganese composite oxide thereby obtained may be crushed. By crushing, the sintering and flocculation may be dissolved, so that the particle size distribution may be adjusted.

In the production method of the positive electrode active material of the present embodiment, the composite oxide to be used may include, besides the composite hydroxide 1 containing the secondary particle 3 formed of the flocculated primary particles 2, the independent primary particle 2 such as, for example, the primary particle 2 that is not flocculated as the secondary particle 3 and the primary particle 2 that is dropped off from the secondary particle 3 after having been flocculated. In addition, the composite oxide to be used may include a composite hydroxide or a composite oxide that is obtained by oxidizing the composite hydroxide that is produced with a method other than the above-described method, so far as the effects of the present invention are not impaired by the addition thereof. The positive electrode active material to be obtained mainly includes the lithium-nickel-manganese composite oxide containing the secondary particle formed of the flocculated primary particles, in which the material may include independent primary particles such as, for example, the primary particle that is not flocculated as the secondary particle and the primary particle that is dropped off from the secondary particle after having been flocculated.

5. Nonaqueous Electrolyte Secondary Battery

One example of the nonaqueous electrolyte secondary battery of the present embodiment will be explained with respect to each composition element separately. The nonaqueous electrolyte secondary battery of the present embodiment includes a positive electrode, a negative electrode, and a nonaqueous electrolyte solution, in which this may be composed of the same composition elements as those of a general lithium ion secondary battery. It should be noted that the embodiments explained hereinafter are mere examples, so that the nonaqueous electrolyte secondary battery may be carried out not only with the embodiments described below but with the embodiments changed or modified variously based on a knowledge of a person ordinarily skilled in the art. In addition, the nonaqueous electrolyte secondary battery is not particularly limited in the use thereof.

(1) Positive Electrode

The positive electrode is formed of a positive electrode mixed material. Hereinafter, the positive electrode mixed material as well as each material that constitutes the mixed material will be explained. A positive electrode mixed material paste is prepared by mixing the positive electrode active material of the present embodiment as described above with a conductive agent and a binder, and as needed, an activated carbon, a solvent, and the like for the purpose of viscosity adjustment, followed by kneading this resulting mixture.

The mixing ratios of each material in the positive electrode mixed material serve as an element to determine the performance of the lithium secondary battery; and thus, the ratios can be adjusted in accordance with the use thereof. The mixing ratios of the materials may be made as same as those of publicly known positive electrodes of the lithium secondary battery; therefore, for example, when total mass of the solid portions in the positive electrode mixed material excluding the solvent is regarded as 100% by mass, the positive electrode active material may be included therein in the range of 60% by mass to 95% by mass, the conductive agent in the range of 1% by mass to 20% by mass, and the binder in the range of 1% by mass to 20% by mass.

The positive electrode mixed material paste thus obtained is applied to the surface of an electric collector made of, for example, aluminum foil, and then it is dried to scatter the solvent off to prepare the sheet-like positive electrode. As needed, in order to increase the electrode density, it can also be pressed with a roll-press or the like. The sheet-like positive electrode obtained in the way as described above is, for example, cut to a proper size in accordance with the target battery; and then, this can be used for fabrication of the battery. However, the preparation method of the positive electrode is not limited to the above-mentioned example, so that it may also be prepared by other methods.

With regard to the conductive agent to be used, for example, graphite (such as natural graphite, artificial graphite, and expandable graphite) as well as a carbon black material such as acetylene black and Ketchen black may be used. With regard to the binder, such as, for example, polyvinylidene fluoride, polytetrafluoroethylene, an ethylene propylene diene rubber, a fluorine rubber, a styrene-butadiene, a cellulose-based resin, and polyacrylic acid may be used.

The binder plays a role to bind the active material particles; for example, fluorine-containing resins such as polytetrafluoroethylene, polyvinylidene fluoride, and a fluorine rubber as well as thermoplastic resins such as polypropylene and polyethylene may be used. As needed, a solvent, which can disperse the positive electrode active material, a conductive agent, and an activated carbon, and also can dissolve the binder, is added to the positive electrode mixed material. With regard to the solvent, an organic solvent specifically such as N-methyl-2-pyrrolidone may be used. In addition, in order to increase an electric double layer capacity, an activated carbon may be added to the positive electrode mixed material.

(2) Negative Electrode

As the negative electrode, a metal lithium, a lithium alloy, or the like may be used. Alternatively, a shaped article may be used as the negative electrode, the article being prepared in such a way that a negative electrode mixed material that is prepared by mixing a binder with a negative electrode active material capable of inserting and de-inserting a lithium ion followed by addition of a suitable solvent so as to make it a paste-like form, is applied to the surface of an electric collector made of metal foil such as copper foil, and then, it is dried and, as needed, compressed in order to increase the electrode density.

With regard to the negative electrode active material, for example, natural graphite, artificial graphite, a fired body of an organic compound such as a phenol resin, or a powdery body of a carbon substance such as cokes may be used. In this case, similarly to the positive electrode, among others a fluorine-containing resin such as polyvinylidene fluoride may be used as the negative electrode binder; and as the solvent to disperse the active material and the binder, an organic solvent such as N-methyl-2-pyrrolidone may be used.

(3) Separator

Between the positive electrode and the negative electrode, a separator is interposed, and then it is disposed. The separator separates between the positive electrode and the negative electrode, and it also stores the electrolyte, in which publicly known materials may be used; for example, a thin film that is made of polyethylene, polypropylene, or the like and has many fine pores may be used.

(4) Nonaqueous Electrolyte Solution

The nonaqueous electrolyte solution is obtained by dissolving a lithium salt as a supporting salt in an organic solvent. Illustrative example of the organic solvent includes cyclic carbonates such as ethylene carbonate, propylene carbonate, butylene carbonate, and trifluoropropylene carbonate; linear carbonates such as diethyl carbonate, dimethyl carbonate, ethyl methyl carbonate, and dipropyl carbonate; ether compounds such as tetrahydrofuran, 2-methyl tetrahydrofuran, and dimethoxy ethane; sulfur compounds such as ethyl methyl sulfone and butane sultone; and phosphorous compounds such as triethyl phosphate and trioctyl phosphate, in which a single solvent selected from these solvents or a mixture of two or more of them may be used.

With regard to the supporting salt, $LiPF_6$, $LiBF_4$, $LiClO_4$, $LiAsF_6$, $LiN(CF_3SO_2)_2$, composite salts of them, or the like may be used. Furthermore, the nonaqueous electrolyte solution may include a radical scavenger, a surfactant, a flame retardant, and so forth.

(5) Form and Composition of the Battery

The form of the lithium secondary battery of the present invention that includes the positive electrode, the negative electrode, the separator, and the nonaqueous electrolyte solution as explained above is not particularly limited; and thus it can have various forms such as a cylindrical form and a laminate form. In any form used, the positive electrode and the negative electrode are laminated via the separator to form an electrode body; then, the electrode body thus obtained is impregnated with the nonaqueous electrolyte solution. Then, between a positive electrode collector and a positive electrode terminal leading to outside, and between a negative electrode collector and a negative electrode terminal leading to outside are connected by a collector lead or the like. Then, the composition thus formed is sealed in a battery case thereby completing the battery.

EXAMPLES

Example 1

[Preparation of Composite Hydroxide]

Prescribed amount of purified water was taken into a reaction vessel (50 L); the stirring power was set at 6.0 kW/m$^2$; and with stirring, the temperature inside the vessel was set at 42° C. At this time, inside the reaction vessel was made to a non-oxidative atmosphere (oxygen concentration: 1% by volume) thereby adjusting the dissolved oxygen concentration in the solution in the reaction vessel at 1.0 mg/L. Into this reaction vessel were continuously and simultaneously added a 2.0 M mixed aqueous solution including nickel sulfate, cobalt sulfate, and manganese sulfate with the molar ratio of nickel:cobalt:manganese=46:30:24, an alkali solution of a 25% by mass aqueous sodium hydroxide solution, and a complexing agent of a 25% by mass aqueous ammonia solution so as to make the aqueous reaction solution. The pH value and the ammonium ion concentration were controlled such that the dissolved nickel concentration might become constant at 400 mg/L. At this time, in the reaction vessel, the pH value was 11.8 and the ammonium ion concentration was in the range of 12 to 15 g/L. The flow rate of the mixed aqueous solution was controlled so that the residence time thereof in the reaction vessel might become 8 hours. After the neutralization crystallization reaction was stabilized, the slurry including the nickel-cobalt-manganese composite hydroxide was recovered from the overflow port; and then, a cake of the nickel-cobalt-manganese composite hydroxide was obtained by suction filtration (crystallization process). Impurities included therein were washed out by pouring 1 L of purified water to 140 g of the nickel-cobalt-manganese composite hydroxide present in the filtration equipment that was used for filtration to obtain the nickel-cobalt-manganese composite hydroxide (washing process).

Figure 6A:
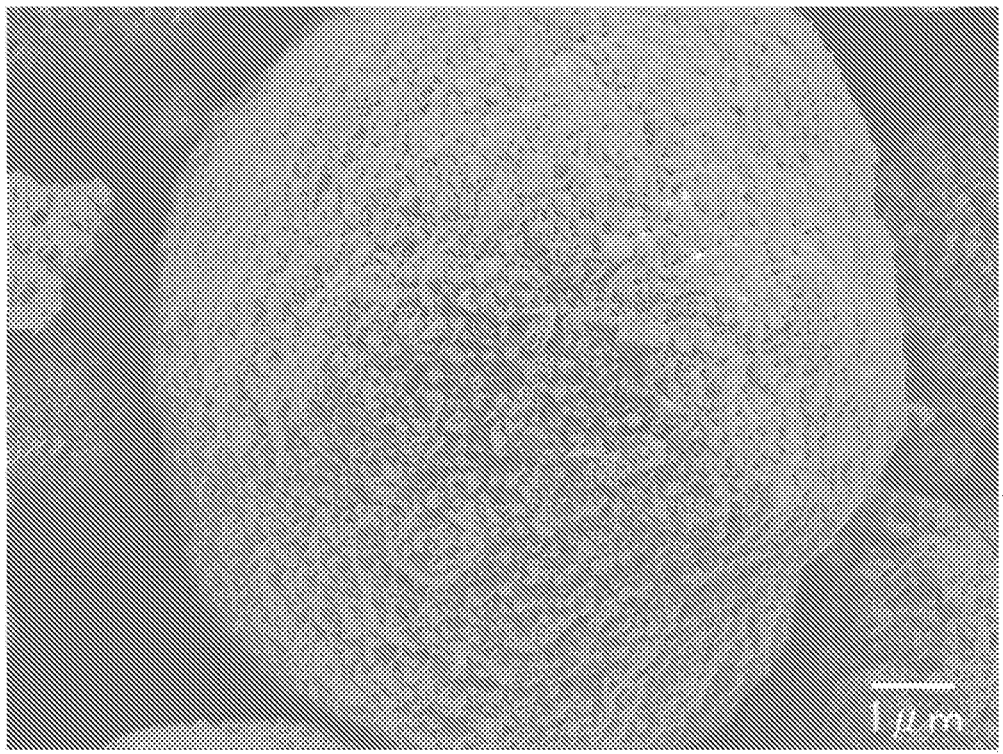
FIGS. 6(A) and 6(B) are pictures illustrating one example of the SEM images of the surface and the cross section of the nickel-manganese composite hydroxide of the present embodiment (Example 1).
Figure 6B:
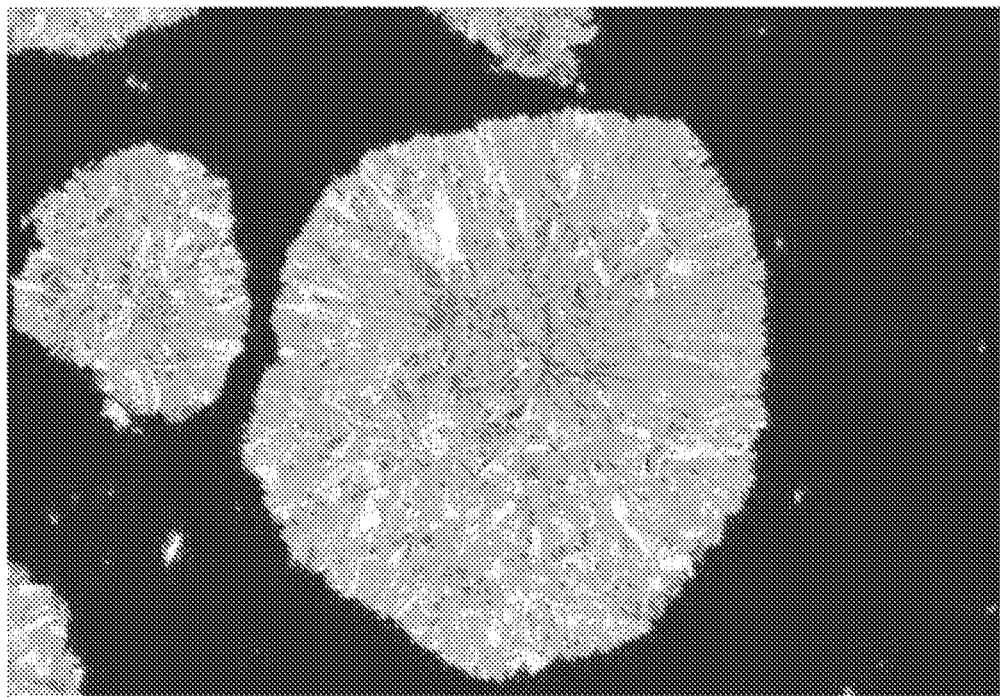

The structures of the surface and of the cross section of the nickel-cobalt-manganese composite hydroxide thereby obtained were observed with a scanning electron microscope. As a result, it was confirmed that the aspect ratio was at least 3 and that the primary particles were disposed radially from inside of the particles to outside thereof (FIG. 6(A): surface, FIG. 6(B): cross section). In addition, in the 50% region of the radius from the outer circumference of the secondary particle to the central part of the secondary particle, at least 50% of the primary particles were disposed radially.

As a measurement result of the nickel-cobalt-manganese composite hydroxide with an X-ray diffraction method, it was confirmed that the ratio (I(101)/I(001)) was 0.094, I(101) being the diffraction peak intensity of the 101 plane, and I(001) being the diffraction peak intensity of the 001 plane. In addition, it was confirmed that the volume-average particle diameter MV of the nickel-cobalt-manganese composite hydroxide was 8.2 μm, and that [(D90−D10)/average particle diameter] was 0.8. In addition, as a result of the pore volume distribution measurement, it was confirmed that the total pore volume of the nickel-cobalt-manganese composite hydroxide was 0.021 cm$^3$/g, and the ratio (dV(log r)) of the pore volume having the pore size of up to 40 nm was 65%. In order to assess the degree of sparsity/density, the particle cross section and the void area within the particle were obtained by using an image analysis software (WinRoof 6.1.1); and then, the degree of sparsity/density was calculated from the equation [(void area within the particle)/(particle cross section)×100](%). Twenty cross sections of the secondary particles that were at least 80% of the volume-average particle diameter (MV) were arbitrarily selected, and the degree of sparsity/density of each of the cross sections of the secondary particles was measured; and the average value thereof (average degree of sparsity/density) was calculated to be 3.8%. After the obtained nickel-cobalt-manganese composite hydroxide was dissolved into an inorganic acid, the chemical analysis thereof was carried out with an ICP emission spectrometry; and as a result, the composition thereof was $Ni_{0.46}Co_{0.30}Mn_{0.4}(OH)_2$. The characteristics of the obtained composite hydroxide are listed in Table 1.

[Preparation of the Positive Electrode Active Material]

After the nickel-cobalt-manganese composite hydroxide and lithium carbonate were weighed so as to give the Li/Me ratio of 1.02, they were fully mixed to obtain a lithium mixture by using a shaker mixer (TURBULA Type T2C; manufactured by Willy A. Bachofen AG (WAB)) with applying a strength that the shape and structure of the precursor were able to be still retained (mixing process).

The lithium mixture thus obtained was inserted into a magnesia-made firing vessel, and by using a sealed-type electric furnace, the temperature thereof was raised in an air atmosphere with the flow rate thereof being 10 L/minute and with the temperature raising rate of 2.77° C./minute until 900° C., at which temperature the mixture was kept for 10 hours; and then, it was cooled in the furnace to room temperature to obtain the lithium-transition metal composite oxide (firing process).

Figure 8A:
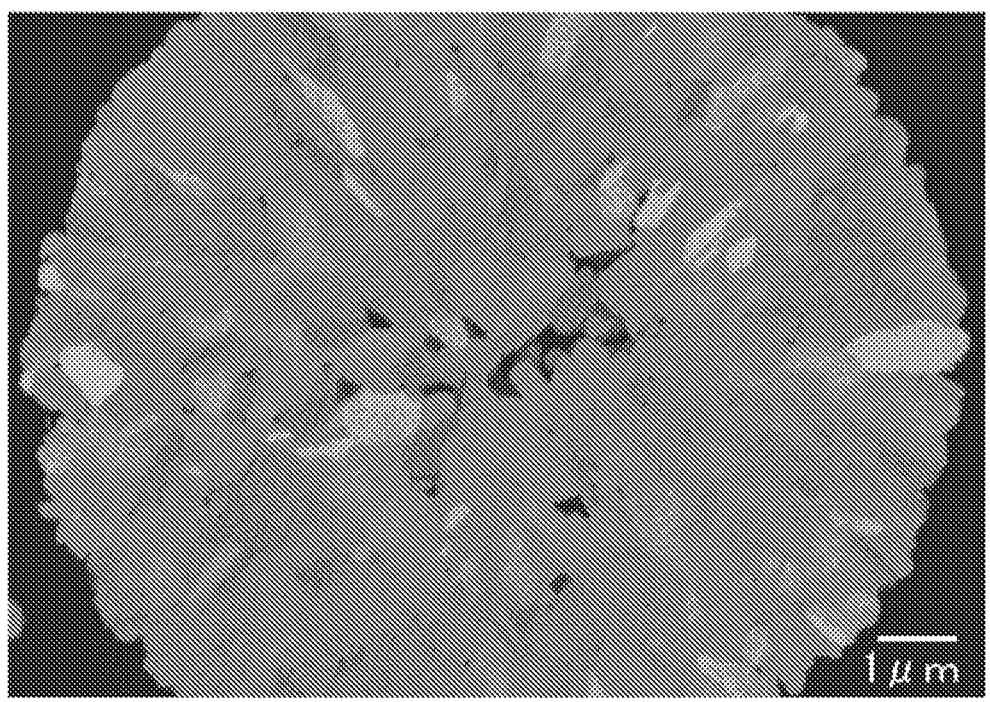
FIG. 8(A) is a picture illustrating one example of the SEM image of the cross section of the nickel-manganese composite hydroxide of the present embodiment (Example 1)

By observation of the cross section of the obtained positive electrode active material with a scanning electron microscope, it was confirmed that the primary particles having the aspect ratio of at least 2 were orientated from the inside of the particle to the outside thereof (FIG. 8(A)). It was confirmed that the volume-average particle diameter MV of the positive electrode active material was 7.9 μm, and [(D90−D10)/average particle diameter] thereof was 0.8. Evaluation results of other powder characteristics are listed in Table 2.

[Fabrication and Evaluation of the Battery]

Figure 9A:
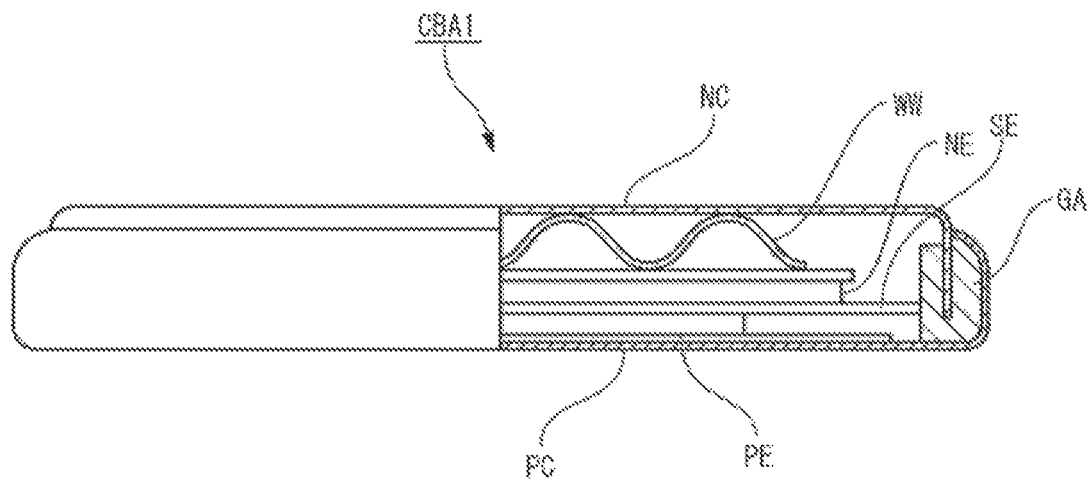
FIGS. 9(A) and 9(B) are schematic cross-sectional views of a coin-type battery used for the battery evaluation.
Figure 9B:
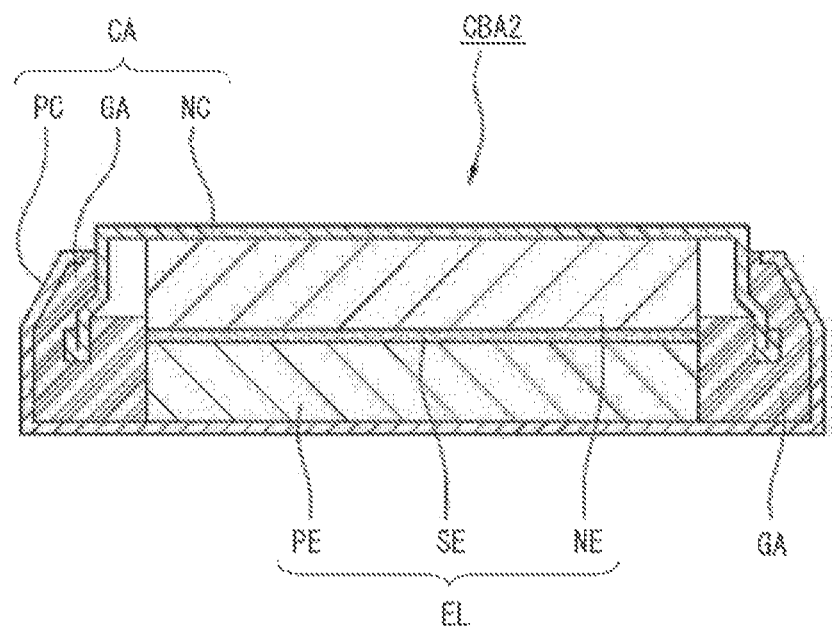

After 52.5 mg of the obtained positive electrode active material, 15 mg of acetylene black, and 7.5 mg of polytetrafluoroethylene resin (PTFE) were mixed, the resulting mixture was press molded with the applied pressure of 100 MPa to prepare the positive electrode (electrode for evaluation) PE having the diameter of 11 mm and the thickness of 100 μm, as depicted in FIGS. 9(A) and 9(B). The positive electrode PE thus prepared was dried at 120° C. in a vacuum dryer for 12 hours. Then, the 2032 coin-type battery CBA was prepared by using this positive electrode PE under an Ar atmosphere in a globe box in which the dew point was controlled at −80° C. For the negative electrode NE, a lithium (Li) metal having the diameter of 17 mm and the thickness of 1 mm was used. For the electrolyte solution, an equal amount mixture of ethylene carbonate (EC) and diethyl carbonate (DEC) (manufactured by Tomiyama Pure Chemical Industries, Ltd.) including 1-M $LiClO_4$ as the supporting electrolyte was used. For the separator SE, a polyethylene porous film having the film thickness of 25 μm was used. The coin-type battery having the gasket GA and the wave washer WW was fabricated to the battery having a coin-like shape by using the positive electrode can PC and the negative electrode can NC.

[Battery Evaluation]

The initial discharging capacity, the cycle capacity retention rate, and the positive electrode resistance, used to evaluate the performance of the obtained coin-type battery, are defined as follows.

The initial discharging capacity was measured as follows. Namely, after the open circuit voltage (OCV) was stabilized by allowing to leave the coin-type battery CBA1 for about 24 hours after it was prepared, it was charged to the cut-off voltage of 4.3 V with the current density to the positive electrode being 0.1 mA/cm$^2$, and after 1 hour of pause, it was discharged to the cut-off voltage of 3.0 V, and thereby the capacity at this time was regarded as the initial discharging capacity.

The cycle capacity retention rate was evaluated as follows. Namely, the cycle to charge until 4.1 V and discharge until 3.0 V with the current density to the positive electrode being 2 mA/cm$^2$ was repeated at 60° C. for 500 times with the 2C rate; and the capacity retention rate was obtained by calculating the ratio of the discharging capacity after the repeat of the charging and discharging operations to the initial discharging capacity. Measurements of the charging and discharging capacities were carried out by using a multi-channel voltage/electricity generator (R6741A; manufactured by Advantest Corp.).

Figure 10:
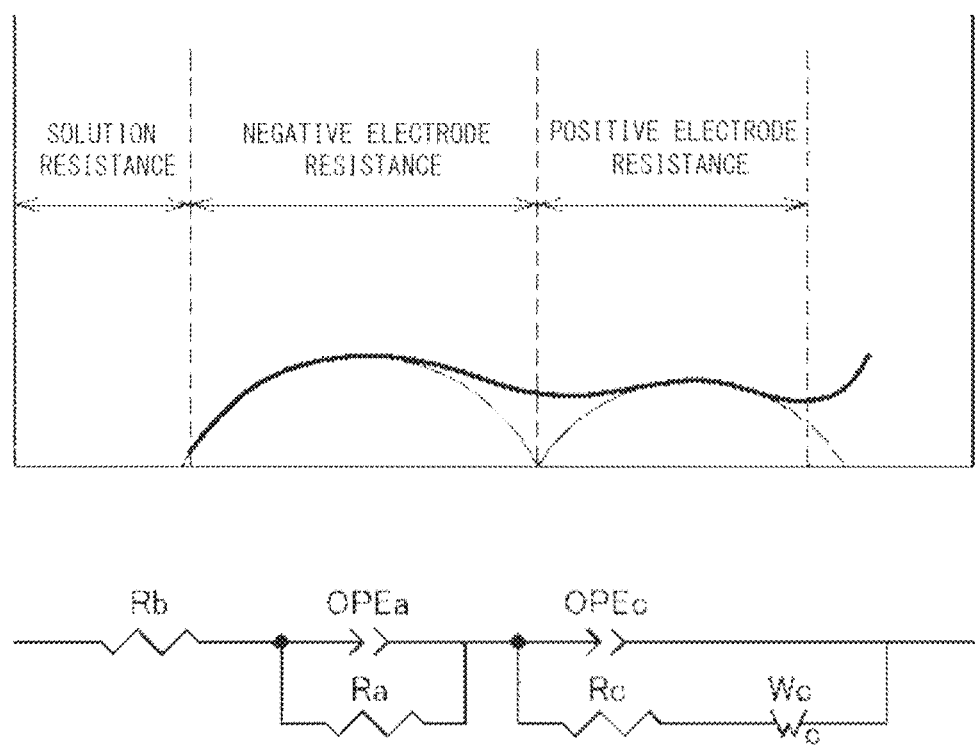
FIG. 10 is a measurement example of the impedance evaluation and a schematic explanatory drawing of the equivalent circuit used for the analysis.

The positive electrode resistance was evaluated as follows. Namely, when the coin-type battery CBA1 is charged with the charge voltage of 4.1 V, and the measurement is made by the alternate current impedance method using a frequency response analyzer and a potentiogalvanostat (1255B, manufactured by Solartron Analytical Inc.), the Nyquist plot depicted in FIG. 10 can be obtained. The Nyquist plot is represented as the sum of the characteristic curves showing the solution resistance, the negative electrode resistance and the capacity thereof, and the positive electrode resistance and the capacity thereof. Accordingly, based on the Nyquist plot, the fitting calculation was carried out to obtain the positive electrode resistance value by using the equivalent circuit.

When the battery evaluation was carried out with regard to the coin-type battery having the positive electrode that was formed by using the positive electrode active material, the initial discharging capacity of 169.1 mAh/g, the positive electrode resistance of 1.84Ω, and the capacity retention rate after 500 cycles of 78.9% were obtained.

The characteristics of the nickel-cobalt-manganese composite hydroxide obtained by this Example are listed in Table 1; and the characteristics of the positive electrode active material and evaluation results of the coin-type battery that is produced by using this positive electrode active material are listed in Table 2. The same items of Examples 1 to 4 and of Comparative Examples 1 to 6, which were carried out below, are also included in Table 1 and Table 2.

Example 2

The positive electrode active material was obtained and evaluated in the same way as Example 1 except that the nickel concentration in the aqueous reaction solution in the crystallization process was changed to 600 mg/L. The evaluation results of the positive electrode active material thereby obtained are listed in Table 2.

Example 3

The positive electrode active material was obtained and evaluated in the same way as Example 1 except that the residence time of the mixed aqueous solution in the crystallization process was changed to 10 hours.

Example 4

The positive electrode active material was obtained and evaluated in the same way as Example 1 except that the residence time of the mixed aqueous solution in the crystallization process was changed to 6 hours.

Comparative Example 1

The positive electrode active material was obtained and evaluated in the same way as Example 1 except that the stirring power in the crystallization process was changed to 5.0 kW/m², and the dissolved oxygen concentration of the aqueous reaction solution was changed to 8.0 mg/L.

Comparative Example 2

The positive electrode active material was obtained and evaluated in the same way as Example 1 except that the nickel concentration of the aqueous reaction solution in the crystallization process was changed to 80 mg/L, and the residence time of the mixed aqueous solution was changed to 16 hours.

Comparative Example 3

The positive electrode active material was obtained and evaluated in the same way as Example 1 except that the nickel concentration of the aqueous reaction solution in the crystallization process was changed to 80 mg/L.

Comparative Example 4

The positive electrode active material was obtained and evaluated in the same way as Example 1 except that the nickel concentration of the aqueous reaction solution in the crystallization process was changed to 1,500 mg/L.

Comparative Example 5

The positive electrode active material was obtained and evaluated in the same way as Example 1 except that the temperature of the aqueous reaction solution in the crystallization process was changed to 65° C.

TABLE 1

|  |  |  | Example 1 | Example 2 | Example 3 | Example 4 | Compara. Example 1 | Compara. Example 2 | Compara. Example 3 | Compara. Example 4 | Compara. Example 5 |
|---|---|---|---|---|---|---|---|---|---|---|---|
| Precipitation condition | Dissolved oxygen concentration | mg/L | 1.0 | 1.0 | 1.0 | 1.0 | 8.0 | 1.0 | 1.0 | 1.0 | 1.0 |
|  | Dissolved Ni concentration | mg/L | 400 | 600 | 400 | 400 | 400 | 80 | 80 | 1500 | 400 |
|  | Stirring power | Kw/m³ | 6.0 | 6.0 | 6.0 | 6.0 | 5.0 | 6.0 | 6.0 | 6.0 | 6.0 |
|  | Precipitation temperature | ° C. | 42 | 42 | 42 | 42 | 42 | 42 | 42 | 42 | 65 |
|  | pH | — | 11.8 | 11.6 | 11.8 | 11.8 | 11.8 | 12.3 | 12.3 | 11.4 | 11.8 |
| Primary particle | Residence time | hr | 8 | 8 | 10 | 6 | 8 | 16 | 8 | 8 | 8 |
|  | Long diameter | nm | 857 | 631 | 922 | 536 | 1439 | 437 | 394 | 798 | 367 |
|  | Short diameter | nm | 116 | 96 | 132 | 79 | 136 | 231 | 206 | 355 | 201 |
| Secondary particle | Aspect ratio(long diameter/short diameter) | — | 7.4 | 6.6 | 7.0 | 6.8 | 10.6 | 1.9 | 1.9 | 2.2 | 1.8 |
|  | Cross section structure | — |  | Radial structure |  |  | Porous structure | Random flocculation structure |  |  |  |
|  | I(101)/I(001) | — | 0.094 | 0.082 | 0.121 | 0.116 | 0.133 | 0.155 | 0.164 | 0.210 | 0.175 |
|  | Volume-average particle diameter MV | μm | 8.2 | 9.1 | 10.0 | 6.8 | 4.8 | 8.1 | 4.5 | 12.3 | 6.5 |

TABLE 1-continued

|  |  | Example 1 | Example 2 | Example 3 | Example 4 | Compara. Example 1 | Compara. Example 2 | Compara. Example 3 | Compara. Example 4 | Compara. Example 5 |
|---|---|---|---|---|---|---|---|---|---|---|
| (D90 − D10)/ average particle diameter MV | — | 0.80 | 0.87 | 0.90 | 0.65 | 0.48 | 0.65 | 0.56 | 0.96 | 0.62 |
| Sparse density | % | 3.8 | 4.0 | 4.1 | 4.7 | 42.6 | 0.8 | 0.7 | 0.4 | 0.4 |
| Total pore volume | cm³/g | 0.021 | 0.023 | 0.019 | 0.020 | 0.032 | 0.016 | 0.022 | 0.012 | 0.017 |
| Composition | — | Ni:Co:Mn = 0.46:0.30:0.24 | | | | Ni:Co:Mn = 0.46:0.30:0.24 | | | *1) | *2) |

*1) Ni:Co:Mn = 0.44:0.31:0.25
*2) Ni:Co:Mn = 0.46:0.30:0.24

TABLE 2

|  |  |  | Example 1 | Example 2 | Example 3 | Example 4 | Compara. Example 1 | Compara. Example 2 | Compara. Example 3 | Compara. Example 4 | Compara. Example 5 |
|---|---|---|---|---|---|---|---|---|---|---|---|
| Production condition | Li/Me ratio | — | 1.02 | 1.02 | 1.02 | 1.02 | 1.02 | 1.02 | 1.02 | 1.02 | 1.02 |
|  | Maximum attained temperature | °C. | 900 | 900 | 900 | 900 | 900 | 900 | 900 | 900 | 900 |
| Positive electrode active material | Composition | — | $Li_{1.02}Ni_{0.46}Co_{0.30}Mn_{0.24}O_2$ | | | | $Li_{1.02}Ni_{0.46}Co_{0.30}Mn_{0.24}O_2$ | | | *1) | *2) |
|  | Volume-average particle diameter MV | μm | 7.9 | 9.0 | 9.8 | 7.0 | 5.1 | 7.9 | 4.4 | 12.0 | 6.7 |
|  | (D90 − D10)/average particle diameter MV | — | 0.80 | 0.88 | 0.92 | 0.68 | 0.50 | 0.66 | 0.54 | 1.00 | 0.64 |
|  | Tapped density | g/cc | 2.61 | 2.70 | 2.68 | 2.49 | 1.82 | 2.31 | 2.06 | 2.71 | 2.37 |
|  | Sparse density | % | 2.45 | 2.61 | 2.63 | 2.70 | 35.40 | 0.60 | 0.61 | 0.20 | 0.24 |
|  | Particle strength | MPa | 86 | 81 | 80 | 92 | 60 | 112 | 124 | 105 | 102 |
|  | Primary Long diameter | nm | 930 | 701 | 992 | 623 | 1501 | 553 | 464 | 353 | 510 |
|  | Short diameter | nm | 369 | 332 | 386 | 312 | 356 | 414 | 384 | 455 | 381 |
|  | Aspect ratio(long diameter/short diameter) | — | 2.7 | 2.1 | 2.6 | 2.0 | 4.2 | 1.3 | 1.2 | 1.9 | 1.3 |
|  | Cross section structure | — | Radial structure | | | | Porous structure | Random flocculation structure | | | |
| Battery characteristics | Discharging capacity | mAh/g | 169.1 | 168.2 | 167.0 | 169.8 | 168.5 | 162.3 | 165.3 | 160.4 | 162.5 |
|  | Efficiency | % | 91.1 | 91.0 | 90.2 | 91.4 | 90.3 | 88.0 | 87.3 | 87.4 | 83.0 |
|  | Resistance | Ω | 1.84 | 1.95 | 2.08 | 1.76 | 2.01 | 2.15 | 2.30 | 2.34 | 2.11 |
|  | Capacity retention rate@ after 500 cycles | % | 78.9 | 78.5 | 78.2 | 80.2 | 76.2 | 75.0 | 72.1 | 71.2 | 74.8 |

*1) $Li_{1.02}Ni_{0.44}Co_{0.31}Mn_{0.25}O_2$
*2) $Li_{1.02}Ni_{0.46}Co_{0.30}Mn_{0.24}O_2$ (Evaluation)

In the composite hydroxides of Examples, all of the values, namely, the volume-average particle diameter MV, the [(D90−D10)/average particle diameter] that is the indicator representing a spread of the particle size distribution, the ratio I(101)/I(001) of the diffraction peak intensity of the 101 plane (I(101)) to the peak intensity of the 001 plane (I(001)) measured by the X-ray diffraction measurement, and the pore size, were within suitable respective ranges. In addition, the secondary particles having the structure in which the primary particles having the aspect ratio of at least 3 were radially disposed (radial structure) were formed. The composite hydroxides like these are the most suitable particles to obtain the positive electrode active material having a high capacity and a long life, so that they can be suitably used as the precursors of the positive electrode active material.

In addition, all the positive electrode active materials obtained in Examples had high particle fillability; and the coin-type batteries using these positive electrode active materials had high initial discharging capacities and efficiencies. In addition, the positive electrode active materials obtained in Examples had excellent cycle characteristics and low positive electrode resistances, so that the secondary batteries having excellent characteristics were able to be obtained.

On the other hand in Comparative Example 1, because the dissolved oxygen concentration of the aqueous reaction solution in the crystallization process was made high, oxidation of metals (especially manganese) took place in the obtained composite hydroxide, so that the secondary particle had a porous structure inside thereof. Because of this, the pore size thereof became large. In addition, the volume-average particle diameter MV was small and the particle fillability was poor. In the positive electrode active material obtained in Comparative Example 1, because of the porous structure, the contact interface with the electrolyte solution was large and the capacity was high, but because of a low tap density, the volume energy density was low.

Figure 7A:
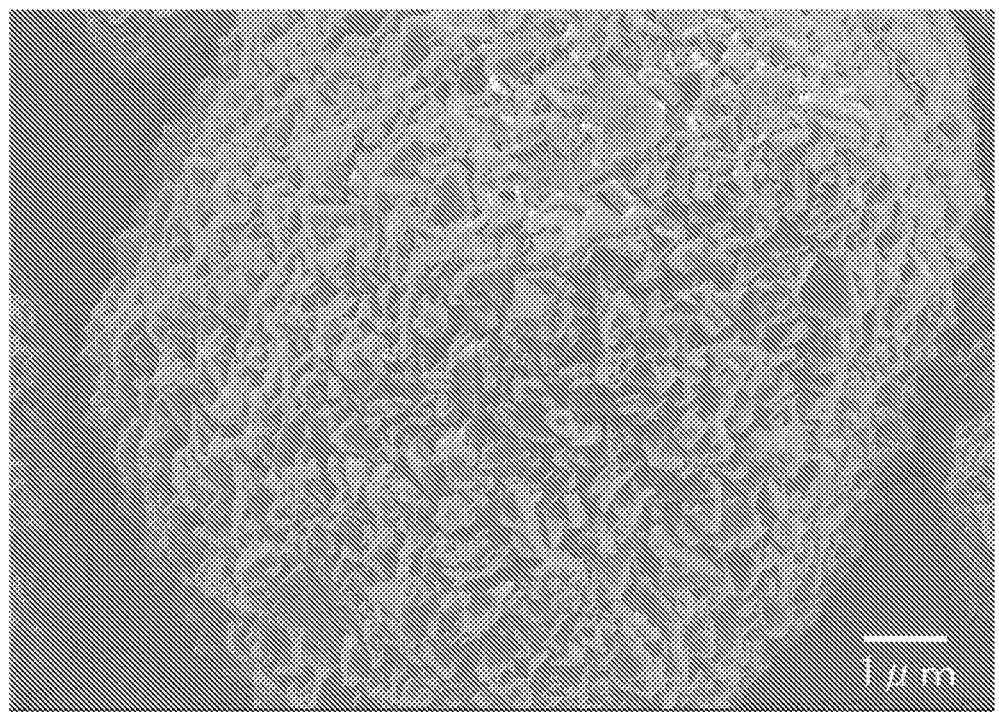
FIGS. 7(A) and 7(B) are pictures of the SEM images of the surface and the cross section of the nickel-manganese composite hydroxide (Comparative Example 2).
Figure 7B:
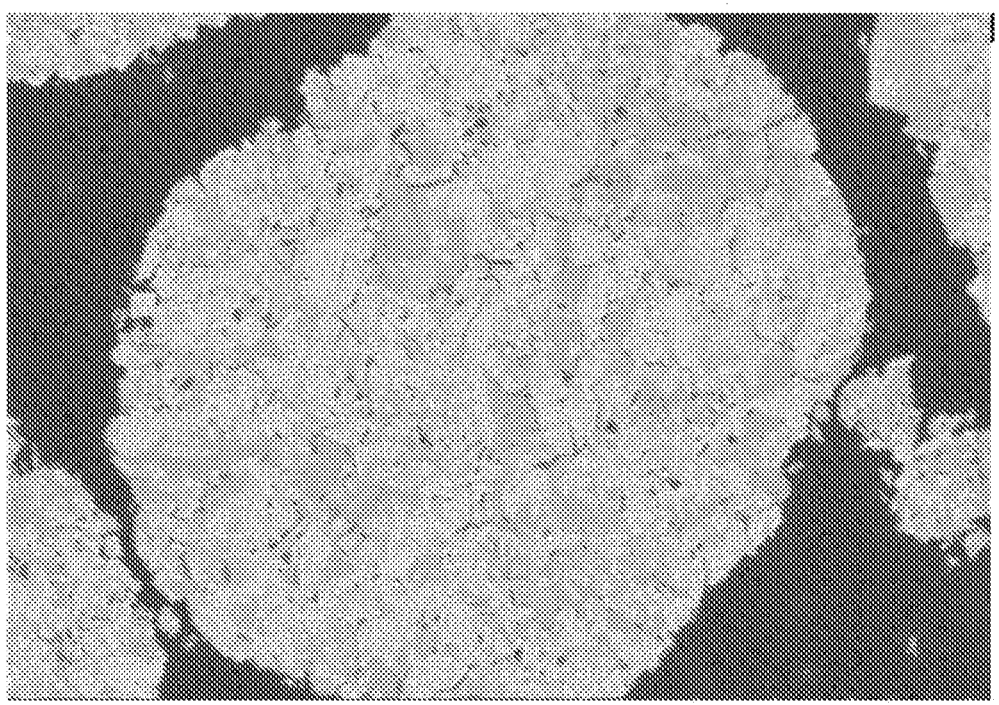
Figure 8B:
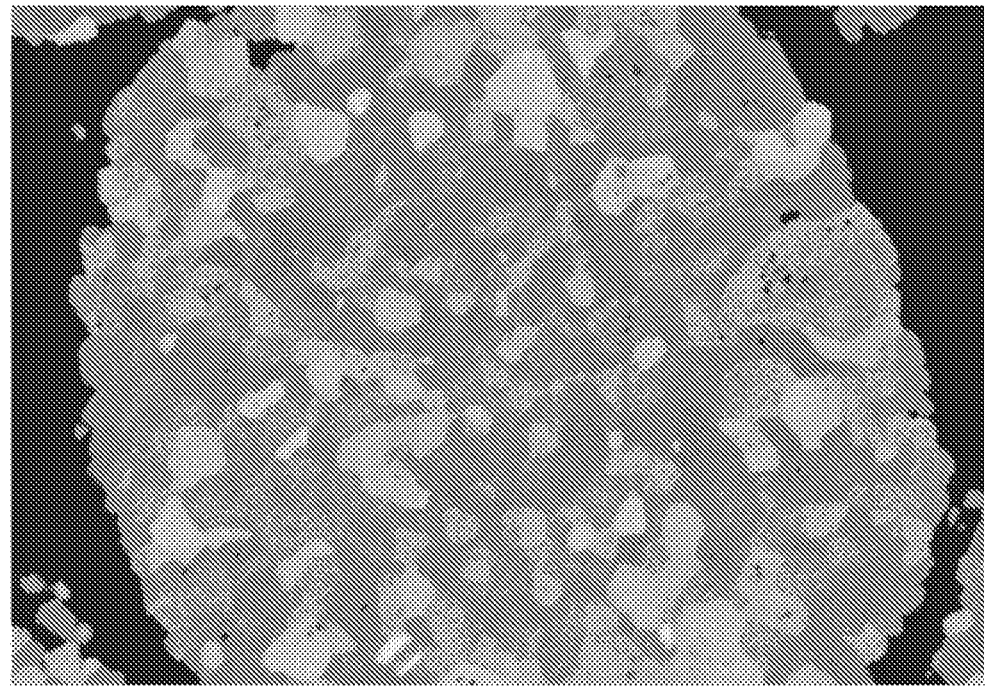
FIG. 8(B) is a picture of the SEM image of the cross section of the nickel-manganese composite hydroxide (Comparative Example 2).

In Comparative Example 2, the nickel concentration of the aqueous reaction solution in the crystallization process was made low and the residence time of the mixed aqueous solution was made long, so that in the composite hydroxide obtained, the primary particle grew thereby leading to the structure in which the particles having almost the same aspect ratio were flocculated (random flocculation structure) (FIGS. 7(A) and 7(B)). Besides, the particles were so dense that they hardly had the pores having the size of up to 40 nm. In the positive electrode active material obtained in Comparative Example 2, the aspect ratios of the primary particles thereof were almost the same among themselves and they had the structure in which the particles were seemingly flocculated randomly (FIG. 8(B)), so that the positive electrode resistance was high and the capacity was low. In addition, inside of the particle was so dense that it was easily cracked by the volume shrinkage upon charging and discharging thereby resulting in a poor cycle characteristic.

In Comparative Example 3, the nickel concentration of the aqueous reaction solution in the crystallization process was made low so that the particles were not able to grow sufficiently well during the same residence time of the mixed aqueous solution as Example 1; as a result, the volume-average particle diameter MV in the composite hydroxide thereby obtained was small. Inside of the particle was dense, and it had the structure in which the primary particles having almost the same aspect ratio were flocculated. In the positive electrode active material obtained in Comparative Example 3, the volume-average particle diameter MV was so small that the tap density was low. For the same reasons as Comparative Example 2, both the capacity and the life were poor.

In Comparative Example 4, the nickel concentration in the aqueous reaction solution in the crystallization process was made high so that the composition of the composite hydroxide thereby obtained shifted. In addition, in the obtained composite hydroxide, the primary particle grew thereby leading to the structure in which the primary particles having almost the same aspect ratio were flocculated. In the positive electrode active material obtained in Comparative Example 4, the aspect ratios of the primary particles were almost the same thereby leading to the structure in which the particles are seemingly flocculated randomly with the shifted composition. Therefore, the positive electrode resistance was high and the capacity was low.

In Comparative Example 5, the temperature of the aqueous reaction solution in the crystallization process was made high so that the inside of the particle of the obtained nickel-cobalt-manganese composite hydroxide was dense, and it had the structure in which the primary particles were randomly flocculated. In the positive electrode active material obtained in Comparative Example 5, inside of the particle was dense with the structure in which the primary particles are seemingly flocculated randomly, so that the capacity and the cycle characteristic were poor.

Hereinafter, analysis results of the crystal orientation of the positive electrode active material of the present embodiment will be described.

Example 5

[Preparation of the Positive Electrode Active Material]

After the nickel-cobalt-manganese composite hydroxide obtained with the same conditions as Example 1 each and lithium carbonate were weighed so as to give the Li/Me ratio of 1.04, they were fully mixed to obtain a lithium mixture by using a shaker mixer (TURBULA Type T2C; manufactured by Willy A. Bachofen AG (WAB)) with applying a strength that the shape and structure of the precursor were able to be still retained (mixing process).

The lithium mixture thus obtained was inserted into a magnesia-made firing vessel, and by using a sealed-type electric furnace, the temperature thereof was raised in an air atmosphere with the flow rate thereof being 12 L/minute and with the temperature raising rate of 2.77° C./minute until 900° C., at which temperature the mixture was kept for 10 hours; and then, it was cooled in the furnace to room temperature to obtain the lithium-transition metal composite oxide (firing process).

When the surface and cross section structures of the lithium-nickel-manganese oxide were observed with a scanning electron microscope, it was confirmed that similarly to the nickel-manganese composite hydroxide, the particle having good sphericity was obtained. The particle size distribution of the positive electrode active material thus obtained was measured in the same way as the nickel-manganese composite hydroxide. It was confirmed that the volume-average particle diameter MV was 8.4 μm, and that [(D90−D10)/average particle diameter] was 0.80.

[Fabrication and Evaluation of the Battery]

For evaluation of the positive electrode active material thus obtained, the 2032 coin-type battery was used. As illustrated in FIG. 9(B), the coin-type battery CBA2 is composed of the case CA and the electrode EL that is accommodated in the case CA.

The case CA has the positive electrode can PC having a hollow structure with one side thereof open and the negative electrode can NC that is disposed in the open portion of the positive electrode can PC; and it is configured such that when the negative electrode can NC is disposed in the open portion of the positive electrode can PC, the space may be formed in which the electrode EL is accommodated between the negative electrode can NC and the positive electrode can PC.

The electrode EL includes the positive electrode PE, the separator SE, and the negative electrode NE, and they are stacked in this order, in which they are accommodated in the case CA such that the positive electrode PE may contact with the inner surface of the positive electrode can PC and the negative electrode NE may contact with the inner surface of the negative electrode can NC.

The case CA is provided with the gasket GA; and with this gasket GA, the positive electrode can PC and the negative electrode can NC are fixed in order to keep an electrical insulation state therebetween. In addition, the gasket GA seals the space between the positive electrode can PC and the negative electrode can NC, so that it also has the air-tight and liquid-tight functions between the inside and outside of the case CA.

This coin-type battery CBA2 was fabricated as follows. First, after 52.5 mg of the obtained positive electrode active material, 15 mg of acetylene black, and 7.5 mg of polytetrafluoroethylene resin (PTFE) were mixed, the resulting mixture was press molded with the applied pressure of 100 MPa to prepare the positive electrode PE having the diameter of 11 mm and the thickness of 100 μm. The positive electrode PE thus prepared was dried at 120° C. in a vacuum dryer for 12 hours. Then, by using this positive electrode PE, the negative electrode 3b, the separator SE, and the electrolyte solution, the coin-type battery CBA2 was prepared under an Ar atmosphere in a globe box in which the dew point was controlled at −80° C.

For the negative electrode NE, a negative electrode sheet obtained by punching out to a disk-like shape having the diameter of 14 mm was used, the sheet being the copper foil applied with graphite powders having the average particle diameter of about 20 μm and polyvinylidene fluoride. For the separator SE, a polyethylene porous film having the film thickness of 25 μm was used. For the electrolyte solution, an equal amount mixture of ethylene carbonate (EC) and diethyl carbonate (DEC) (manufactured by Tomiyama Pure Chemical Industries, Ltd.) including 1 M LiClO$_4$ as the supporting electrolyte was used.

[Battery Evaluation]

The initial discharging capacity that was used to evaluate the performance of the obtained coin-type battery CBA2 was defined as follows.

The initial discharging capacity was measured as follows. Namely, after the open circuit voltage (OCV) was stabilized by allowing to leave the coin-type battery CBA2 for about 24 hours after it was prepared, it was charged to the cut-off voltage of 4.3 V with the current density to the positive electrode being 0.1 mA/cm$^2$, and after 1 hour of pause, it was discharged to the cut-off voltage of 3.0 V, and thereby the capacity at this time was regarded as the initial discharging capacity. Measurement of the charging and discharging capacities was carried out by using a multi-channel voltage/electricity generator (R6741A; manufactured by Advantest Corp.).

When battery evaluation was carried out with regard to the coin-type battery having the positive electrode formed by using the positive electrode active material, the initial discharging capacity was 167.9 mAh/g.

[Orientation Evaluation]

The initial discharging capacity, the cycle capacity retention rate, and the positive electrode resistance, used to evaluate the orientation of the obtained active material secondary particle in the radial direction by EBSD (electron backscatter diffraction method), are defined as follows. In view of keeping the conductivity of the target sample for measurement, when the target sample was set inside the measurement apparatus, fixing to the target sample holder was made by using a conductive paste (colloidal carbon paste).

With regard to the measurement instrument, a scanning electron microscope (SEM) equipped with a computer capable of analyzing the crystal direction (ULTRA 55; manufactured by Carl Zeiss GmbH) was used. The acceleration voltage of an electron beam irradiated to the target sample was about 15 kV with the current amount of about 20 nA.

The orientation information in the x-axis and the y-axis was obtained in the strip of 2.5 μm×12.5 μm in the area to measure the crystal direction in the cross section of the target sample (plane to be measured), in which the measurement was made at 250,000 points in total.

In order to easily take the picture of the electron beam scattered by a camera that is installed in the SEM apparatus (Kikuchi beam), the target sample (more specifically the plane to be measured, i.e., the cross section) was tilted about 70 degrees from a horizontal plane so as to irradiate the scattered electron beam to the camera.

The crystal direction of the material obtained by EBSD changes depending on the direction of the standard axis chosen by the observer. Usually, the crystal direction distribution diagram is represented, as the standard axis, by any axis of the orthogonal coordinate axes composed of an x-axis, a y-axis, and a z-axis. Hereinafter, the crystal direction distribution diagrams with the standard axis of x-axis, y-axis, and z-axis are respectively called IPF-X, IPF-Y, and IPF-Z. FIG. 4(A) and FIG. 4(B) are the schematic drawings that express the observer's viewpoints corresponding to each crystal direction distribution diagram. As depicted in FIG. 4(B), when the observation cross section is regarded as the plane of the paper, IPF-X is the crystal direction in the horizontal direction on this plane as the standard. IPF-Y is in the perpendicular direction on this plane as the standard. On the other hand, IPF-Z is the crystal direction in the vertical direction of the observation cross section as the standard.

In the case of the positive electrode material, it is considered that the crystal direction information obtained when the edge of the positive electrode material particle in which the lithium ion is transferred with the electrolyte solution is observed from the particle surface and the crystal direction information of the path in which the lithium ion inside the particle is de-inserted and that is in the radial direction from the center of the particle to the outside thereof are important. Therefore, when the orientation evaluation of the x-axis direction with regard to the radial direction of the particle was carried out, the analysis results of the IPF-X corresponding to the crystal direction observed from these directions were used; and similarly, the analysis results of the IPF-Y were used for the orientation in the y-axis direction.

The scattered electron beam (Kikuchi beam) was observed with a camera, and the data of the Kikuchi pattern observed with the camera were sent to a computer, and then, the Kikuchi pattern was analyzed to determine the crystal direction. For each measurement point of the determined crystal direction data of the target sample, the coordinates (x and y) and the Euler angles ($\phi 1$, $\Phi$, and $\phi 2$) that indicate the crystal direction were obtained.

The measurement points having the values of the Euler angles that were obtained by the sample evaluation were distributed to each crystal direction as the zone axis in accordance with the following conditions.
<001> axis: $\phi 1=0°±30°$, $\Phi=0°±30°$, $\phi 2=0°±30°$
<100> axis: $\phi 1=0°±30°$, $\Phi=90°±30°$, $\phi 2=60°±30°$
<110> axis: $\phi 1=0°±30°$, $\Phi=90°±30°$, $\phi 2=120=±30°$ In accordance with the rule described above, each measurement point can be determined as to in which crystal direction the point is included.

After the above distribution, the ratio of each crystal direction in the plane to be measured was calculated by the number of the measurement points distributed to the respective crystal directions. The results thereof are listed in Table 3.

When executing this process, the commercially available analysis software for EBSD (analysis software for EBSD: Project Manager-Tango, sold by Oxford Instruments, Inc.) was used.

Evaluation results of the orientation and the average particle diameter of the lithium-nickel-manganese positive electrode active material obtained in this Example, as well as the evaluation results of the coin-type battery produced by using this positive electrode active material are listed in Table 3. In addition, the same items of Examples 6 to 7 and Comparative Examples 5 to 6 are listed in Table 3.

Example 6

The positive electrode active material was obtained and evaluated in the same way as Example 1 except that the average particle diameter D50 of the precursor hydroxide in the reaction vessel in the crystallization process was made to 10.2 μm. The evaluation results of the positive electrode active material thus obtained are listed in Table 1.

Example 7

The positive electrode active material was obtained and evaluated in the same way as Example 1 except that the average particle diameter D50 of the precursor hydroxide in the reaction vessel in the crystallization process was made to 10.7 μm, and that $N_2$ and Air amounts were controlled in such a way that the dissolved oxygen concentration in the aqueous reaction solution was 3.0 mg/L. The evaluation results of the positive electrode active material thus obtained are listed in Table 1.

Comparative Example 6

The positive electrode active material was obtained and evaluated in the same way as Example 1 except that the average particle diameter D50 of the precursor hydroxide in the reaction vessel in the crystallization process was made to 8.2 μm, and that $N_2$ and Air amounts were controlled in such a way that the dissolved oxygen concentration in the aqueous reaction solution was 0.2 mg/L. The evaluation results of the positive electrode active material thus obtained are listed in Table 1.

Comparative Example 7

The positive electrode active material was obtained and evaluated in the same way as Example 1 except that the average particle diameter D50 of the precursor hydroxide in the reaction vessel in the crystallization process was made to 10.1 μm, and that $N_2$ and Air amounts were controlled in such a way that the dissolved oxygen concentration in the aqueous reaction solution was 0.2 mg/L. The evaluation results of the positive electrode active material thus obtained are listed in Table 1.

ganese, was sluggish. Because of this, inside of the secondary particle became so sparse that orientation of the plate-like primary particles that constitute the precursor hydroxide were not able to have the preferable morphology. The positive electrode active material of Comparative Example 1 synthesized from this nickel-cobalt-manganese composite hydroxide had a high resistance and a low capacity. The details of the reason for this is not clear yet; but it is presumed that because orientation in the radial direction of the primary particles that constitute the positive electrode active material was not sufficient so that diffusion of the Li ion was not facilitated thereby leading to a lower discharging capacity as compared with the positive electrode active materials of Examples.

Comparative Example 7 is the positive electrode active material obtained by using the same method as Example 1 except that the precursor having the particle diameter made larger was used during the crystallization process. Similarly to Comparative Example 6, in the positive electrode active material of Comparative Example 7, orientation of the plate-like primary particles that similarly constitute the precursor hydroxide were not have the preferable morphology. In addition, the positive electrode active material of Comparative Example 7 had a high resistance and a low capacity. The details of the reason for this is not clear yet; but it is presumed that because orientation in the radial direction of the primary particles of the positive electrode active material was not sufficient so that diffusion of the Li ion was

TABLE 3

| | Average particle diameter MV[μm] | (D90 − D10)/ average particle diameter MV | ab plane orientation rate [%] | | | Charging capacity [mAh/g] | Discharging capacity [mAh/g] |
|---|---|---|---|---|---|---|---|
| | | | x-axis direction | y-axis direction | Orientation | | |
| Example 5 | 8.4 | 0.8 | 67.3 | 88.4 | ○ | 184.3 | 167.9 |
| Example 6 | 10.2 | 0.99 | 58.8 | 66.1 | ○ | 182.5 | 167.8 |
| Example 7 | 10.7 | 0.84 | 81.8 | 73.1 | ○ | 183 | 167.4 |
| Compara. Example 6 | 8.2 | 0.66 | 84.7 | 34.6 | X | 185.8 | 164.5 |
| Compara. Example 7 | 10.1 | 0.99 | 38.7 | 44.7 | X | 181.9 | 165.7 |

(Evaluation Results)

In the EBSD-based orientation evaluation of the positive electrode active materials of Examples, regarding orientations in the radial direction of both the x-axis and y-axis, the rates of the ab plane, which is advantageous in insertion and de-insertion of Li ions, was at least 55%. The positive electrode active materials of Examples exhibited higher discharging capacities as compared with the positive electrode active materials of Comparative Examples in which the rates of the ab plane were less than 55%; and thus, it can be said that these particles are suitable to obtain the positive electrode active material having a high capacity and a long life. In addition, the positive electrode active materials of Examples had a high fillability so that the coin-type batteries using these positive electrode active materials were low in the positive electrode resistance and high in the initial discharging capacity and the efficiency; and thus, they are the batteries having excellent characteristics.

On the other hand, in the nickel-cobalt-manganese composite hydroxide obtained in Comparative Example 6, because the dissolved oxygen concentration in the solution of the crystallization reaction vessel was made low, oxidation of the transition metals, especially oxidation of mannot facilitated thereby leading to a lower discharging capacity as compared with the positive electrode active materials of Examples.

Japanese Patent Application No. 2016-150620 as well as all the literature cited in this specification are herein incorporated by reference in their entirety to the extent allowed by law.

DESCRIPTION OF REFERENCE SIGNS

1 Nickel-manganese composite hydroxide
2 Primary particle (nickel-manganese composite hydroxide)
3 Secondary particle (nickel-manganese composite hydroxide)
4 Void (nickel-manganese composite hydroxide)
C1 Central portion (nickel-manganese composite hydroxide)
d1 Particle diameter (nickel-manganese composite hydroxide)
L Direction of long diameter of primary particle
R1 Radial direction
R2 Area within 50% of a radius of the secondary particle from the outer circumference toward the particle center 10 Positive electrode active material
12 Primary particle (positive electrode active material)
13 Secondary particle (positive electrode active material)
14 Void (positive electrode active material)
C2 Central portion (positive electrode active material)
d2 Particle diameter (positive electrode active material)
CBA1, CBA2 Coin-type battery
PE Positive electrode (electrode for evaluation)
NE Negative electrode
SE Separator
GA Gasket
WW Wave washer
PC Positive electrode can
NC Negative electrode can

The invention claimed is:

1. A nickel-manganese composite hydroxide represented by General Formula (1): $Ni_xMn_yM_z(OH)_{2+\alpha}$ (in Formula (1), M is at least one additional element selected from Co, Ti, V, Cr, Zr, Nb, Mo, Hf, Ta, Fe, and W; and x, y, z, and α satisfy $0.1 \leq x \leq 0.8$, $0.1 \leq y \leq 0.6$, $0 \leq z \leq 0.8$, $x+y+z=1.0$, and $0 \leq \alpha \leq 0.4$) and containing a secondary particle formed of a plurality of flocculated primary particles, wherein
the primary particles have an aspect ratio of at least 3, and at least some of the primary particles are disposed radially in a direction from a central part of the secondary particle to an outer circumference thereof, and
the secondary particle has a ratio (I(101)/I(001)) of a diffraction peak intensity I(101) of a 101 plane to a diffraction peak intensity I(001) of a 001 plane, measured by an X-ray diffraction measurement, of up to 0.15.

2. The nickel-manganese composite hydroxide according to claim 1, wherein in an area within 50% of a radius of the secondary particle from the outer circumference of the secondary particle toward the central part thereof, at least 50% of the primary particles in number relative to a total number of the primary particles present within this area are disposed radially.

3. The nickel-manganese composite hydroxide according to claim 1, wherein a total pore volume in a pore volume distribution is at least 0.015 cm³/g and up to 0.03 cm³/g.

4. The nickel-manganese composite hydroxide according to claim 1, wherein a volume-average particle diameter MV is at least 5 μm and up to 20 μm, and [(D90−D10)/average particle diameter] that is an indicator to represent a spread of particle size distribution is at least 0.7.

5. A method for producing a nickel-manganese composite hydroxide represented by General Formula (1): $Ni_xMn_yM_z(OH)_{2+\alpha}$ (in Formula (1), M is at least one additional element selected from Co, Ti, V, Cr, Zr, Nb, Mo, Hf, Ta, Fe, and W; and x, y, z, and α satisfy $0.1 \leq x \leq 0.8$, $0.1 \leq y \leq 0.6$, $0 \leq z \leq 0.8$, $x+y+z=1.0$, and $0 \leq \alpha \leq 0.4$) and containing a secondary particle formed of a plurality of flocculated primary particles,
the method comprising a crystallization process of forming a nickel-manganese composite hydroxide by neutralizing a salt containing at least nickel and a salt containing at least manganese in an aqueous reaction solution, wherein
in the crystallization process, a dissolved nickel concentration in the aqueous reaction solution is controlled in a range of at least 300 mg/L and up to 1,500 mg/L, a dissolved oxygen concentration is controlled in a range of at least 0.5 mg/L and up to 3.5 mg/L, and a stirring power applied to the aqueous reaction solution is controlled in a range of at least 4 kW/m³ and up to 8 kW/m³.

6. The method for producing a nickel-manganese composite hydroxide according to claim 5, wherein the crystallization process includes continuously adding a mixed aqueous solution including nickel and manganese into a reaction vessel and overflowing slurry including nickel-manganese composite hydroxide particles formed by neutralization to recover the particles.

7. The method for producing a nickel-manganese composite hydroxide according to claim 6, wherein in the crystallization process, a residence time of the mixed aqueous solution in the reaction vessel is at least 3 hours and up to 15 hours.

8. A method for producing a positive electrode active material for a nonaqueous electrolyte secondary battery, the method comprising:
a process of mixing the nickel-manganese composite hydroxide according to claim 1 and a lithium compound to obtain a mixture; and
a process of firing the mixture to obtain a lithium-nickel-manganese composite oxide.

9. The method for producing a positive electrode active material for a nonaqueous electrolyte secondary battery according to claim 8, wherein the nickel-manganese composite hydroxide is obtained by the method comprising a crystallization process of forming a nickel-manganese composite hydroxide by neutralizing a salt containing at least nickel and a salt containing at least manganese in an aqueous reaction solution,
wherein, in the crystallization process, a dissolved nickel concentration in the aqueous reaction solution is controlled in a range of at least 300 mg/L and up to 1,500 mg/L, a dissolved oxygen concentration is controlled in a range of at least 0.5 mg/L and up to 3.5 mg/L, and a stirring power applied to the aqueous reaction solution is controlled in a range of at least 4 kW/m³ and up to 8 kW/m³.

* * * * *